United States Patent
Tanaka et al.

(12) 
(10) Patent No.: US 11,642,792 B2
(45) Date of Patent: May 9, 2023

(54) HOLDING DEVICE AND TRANSPORTING DEVICE

(71) Applicant: Kabushiki Kaisha Toshiba, Minato-ku (JP)

(72) Inventors: Junya Tanaka, Ota (JP); Kohei Nara, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 607 days.

(21) Appl. No.: 16/774,069

(22) Filed: Jan. 28, 2020

(65) Prior Publication Data

US 2021/0053234 A1  Feb. 25, 2021

(30) Foreign Application Priority Data

Aug. 23, 2019  (JP) .............................. JP2019-152972

(51) Int. Cl.
| | |
|---|---|
| *B25J 15/06* | (2006.01) |
| *B25J 17/02* | (2006.01) |
| *B25J 9/16* | (2006.01) |
| *B25J 19/02* | (2006.01) |
| *B25J 19/00* | (2006.01) |

(52) U.S. Cl.
CPC ......... *B25J 15/0616* (2013.01); *B25J 9/1612* (2013.01); *B25J 17/0291* (2013.01); *B25J 19/0004* (2013.01); *B25J 19/02* (2013.01)

(58) Field of Classification Search
CPC .. B25J 15/0616; B25J 9/1612; B25J 17/0291; B25J 19/0004; B25J 19/02
See application file for complete search history.

(56) References Cited

U.S. PATENT DOCUMENTS

| | | | | |
|---|---|---|---|---|
| 5,988,718 A | * | 11/1999 | Sugimoto | ............. B66C 1/0256 414/737 |
| 7,971,916 B2 | * | 7/2011 | Lin | ...................... B25J 15/0052 269/27 |
| 8,684,418 B2 | * | 4/2014 | Lin | ...................... B25J 15/0061 269/21 |
| 9,004,846 B2 | * | 4/2015 | La Rovere | ........... B25J 15/0616 414/737 |
| 10,124,486 B2 | * | 11/2018 | Marttinen | ................. B25J 17/00 |
| 2002/0136626 A1 | * | 9/2002 | Herbermann | ............ B23Q 7/04 414/737 |

FOREIGN PATENT DOCUMENTS

| | | |
|---|---|---|
| EP | 0 659 666 A1 | 6/1995 |
| JP | 7-178692 A | 7/1995 |
| JP | 2005-14097 A | 1/2005 |
| JP | 2009-214277 A | 9/2009 |
| JP | 2017-52069 A | 3/2017 |
| JP | 2020-37146 A | 3/2020 |

* cited by examiner

*Primary Examiner* — Stephen A Vu
(74) *Attorney, Agent, or Firm* — Oblon, McClelland, Maier & Neustadt, L.L.P.

(57) ABSTRACT

In embodiments, a holding device includes a suction pad, a first link, a second link, a base, and a tube member. The first link supports the suction pad so that the suction pad can rotate around a first rotation axis. The second link supports the first link so that the first link can rotate around a second rotation axis. The base supports the second link so that the second link can rotate around a third rotation axis. The tube member communicates the suction pad with the base and can be bent. The second rotation axis and the third rotation axis are not parallel to each other.

14 Claims, 17 Drawing Sheets

HOLDING DEVICE AND TRANSPORTING DEVICE

CROSS-REFERENCE TO RELATED APPLICATIONS

This application is based upon and claims the benefit of priority from Japanese Patent Application No. 2019-152972, filed on Aug. 23, 2019; the entire contents of which are incorporated herein by reference.

FIELD

Embodiments described herein relate generally to a holding device and a transporting device.

BACKGROUND

Transporting devices including a holding device configured to hold goods (objects to be held) are used. Holding devices are required to hold an object to be held in various states.

DETAILED DESCRIPTION

In embodiments, a holding device includes a suction pad, a first link, a second link, a base, and a tube member. The first link supports the suction pad so that the suction pad can freely rotate around a first rotation axis. The second link supports the first link so that the first link can freely rotate around a second rotation axis. The base supports the second link so that the second link can freely rotate around a third rotation axis. The tube member allows communication between the suction pad and the base and can be bent. The second rotation axis and the third rotation axis are not parallel to each other.

Hereinafter, a holding device and a transporting device according to an embodiment will be described below with reference to the drawings.

In the holding device according to the embodiment, an X direction, a Y direction, and a Z direction are defined as follows. The Z direction is a vertical direction and a +Z direction is an upward direction. The X direction and the Y direction are horizontal directions and are orthogonal to each other.

Figure 1:
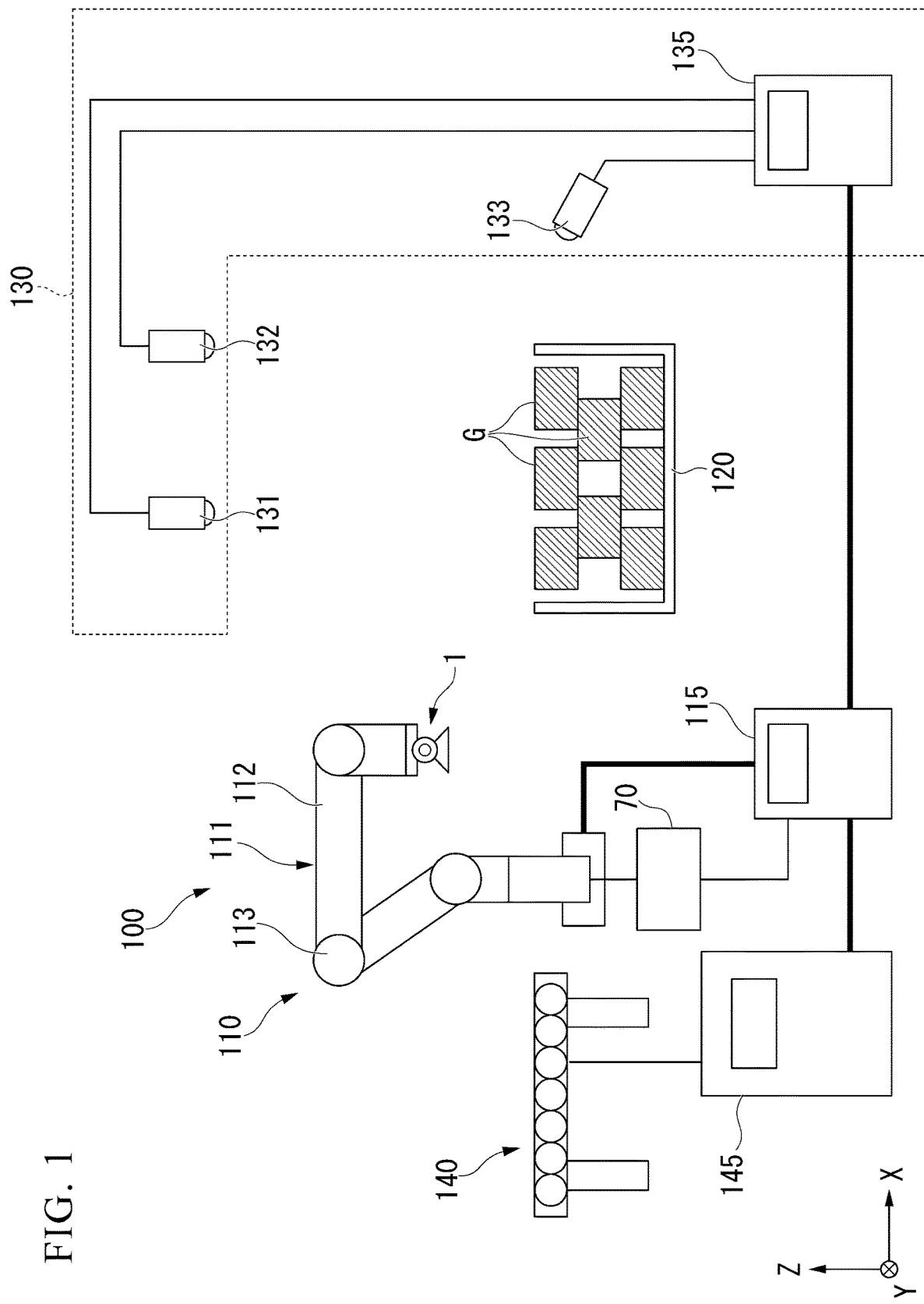
FIG. 1 is a schematic constitution diagram of a transporting system including a transporting device according to an embodiment.

FIG. 1 is a schematic constitution diagram of a transporting system including the transporting device according to the embodiment. A transporting system 100 transports goods (objects to be held) G placed in a goods storage space 120 to a conveyor 140 or the like. The goods storage space 120 is a shelf, a bag, a box, or the like. The goods G may be stacked or placed randomly in the goods storage space 120.

The transporting system 100 includes a recognition device 130 and the transporting device 110.

The recognition device 130 recognizes a state of each item of the goods G The recognition device 130 recognizes a suction state and a holding state of the goods G using a holding device 1. The recognition device 130 includes a plurality of image sensors 131, 132, and 133 and a recognition controller 135.

The plurality of image sensors 131 to 133 are cameras or the like. The cameras may be three-dimensional measurement cameras or the like. The plurality of image sensors 131 to 133 capture images of the goods G or the holding device 1 which holds the goods G through suction from different directions. The plurality of image sensors 131 to 133 transmit the captured image data to the recognition controller 135.

The recognition controller 135 analyzes the image data and recognizes states of the goods such as positions or postures of the goods G. The recognition controller 135 analyzes the image data and recognizes suction states and holding states of the goods G using the holding device 1. The recognition controller 135 transmits information concerning the states of the goods, the suction state, and the holding state to the transporting device 110.

The transporting device 110 holds the goods G and transports the held goods G to the conveyor 140. The transporting device 110 includes a robot arm (a robot or a manipulator) 111, the holding device 1, an air pressure adjusting device 70, and a transporting controller (a controller) 115.

The robot arm 111 includes a plurality of arm sections 112 and a plurality of joint sections 113. The robot arm 111 is formed by the plurality of arm sections 112 being connected in series. The plurality of arm sections 112 are connected to each other in series with the plurality of joint sections 113 therebetween. Each of the joint sections 113 relatively rotates adjacent arm sections 112. The joint sections 113 may relatively linearly move adjacent arm sections 112. For example, a first end portion of the robot arm 111 is connected to the ground. The holding device 1 is connected to a second end portion of the robot arm 111.

The air pressure adjusting device 70 adjusts a pressure of air used in the holding device 1.

The transporting controller 115 controls motions of the robot arm 111, the holding device 1, and the air pressure adjusting device 70. The transporting controller 115 controls the motion of the robot arm 111 such that the holding device 1 is moved to an arbitrary position. The transporting controller 115 controls the motions of the holding device 1 and the air pressure adjusting device 70 such that the goods G are held or released. Thus, the transporting device 110 holds the goods G and transports the held goods G to the conveyor 140 or the like.

The holding device 1, the air pressure adjusting device 70, and the transporting controller 115 will be described later.

The conveyor 140 is a belt conveyor, a roller conveyor, or the like. The conveyor 140 moves the goods G placed thereon. A conveyor controller 145 controls the motion of the conveyor 140.

A constitution of the holding device 1 will be described. In the following description, unless particularly otherwise stated, the holding device 1 in an unloaded state in which a suction pad 2 does not suction the goods G will be described.

Figure 2:
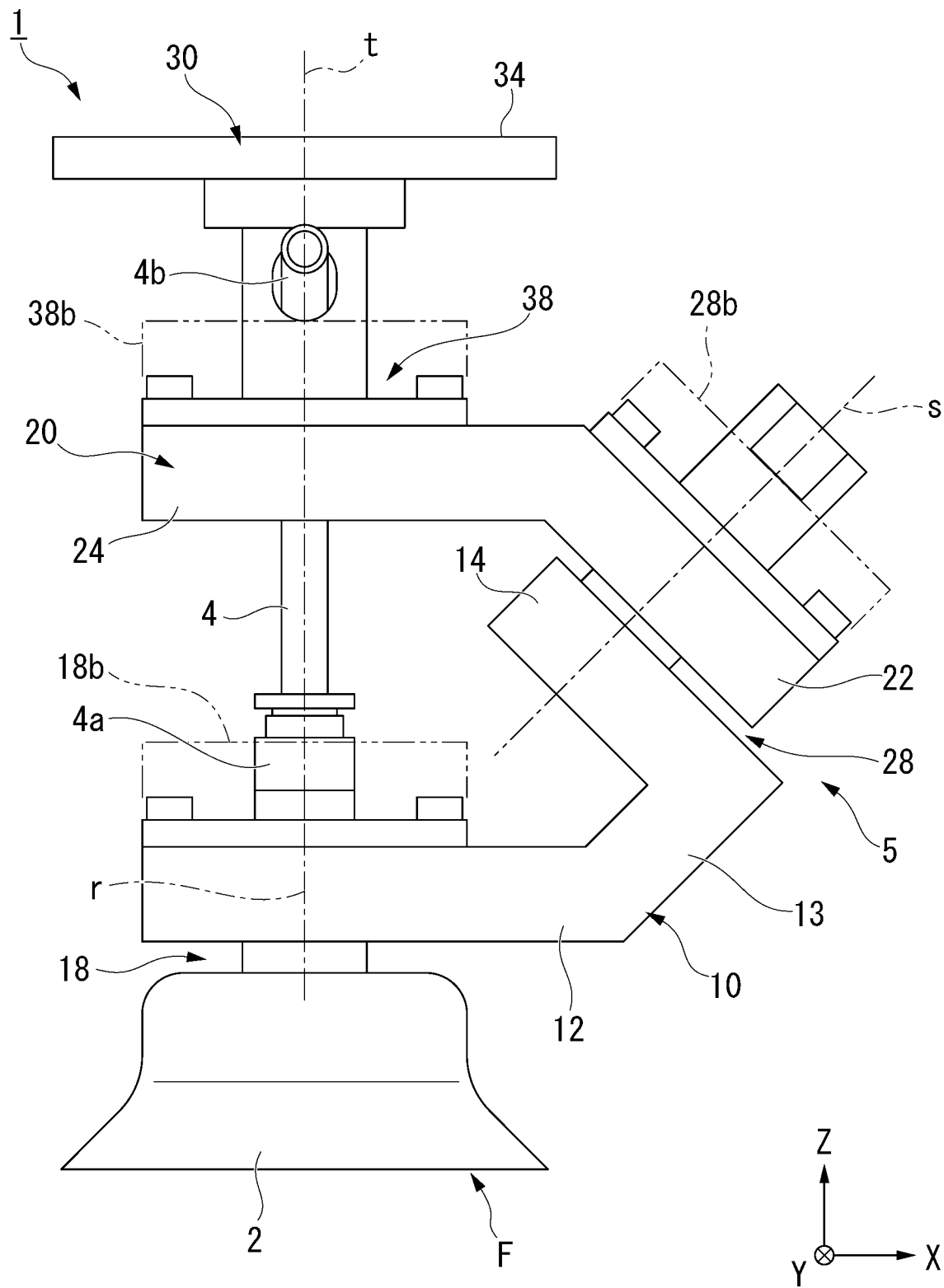
FIG. 2 is a side view of a holding device according to the embodiment.
Figure 3:
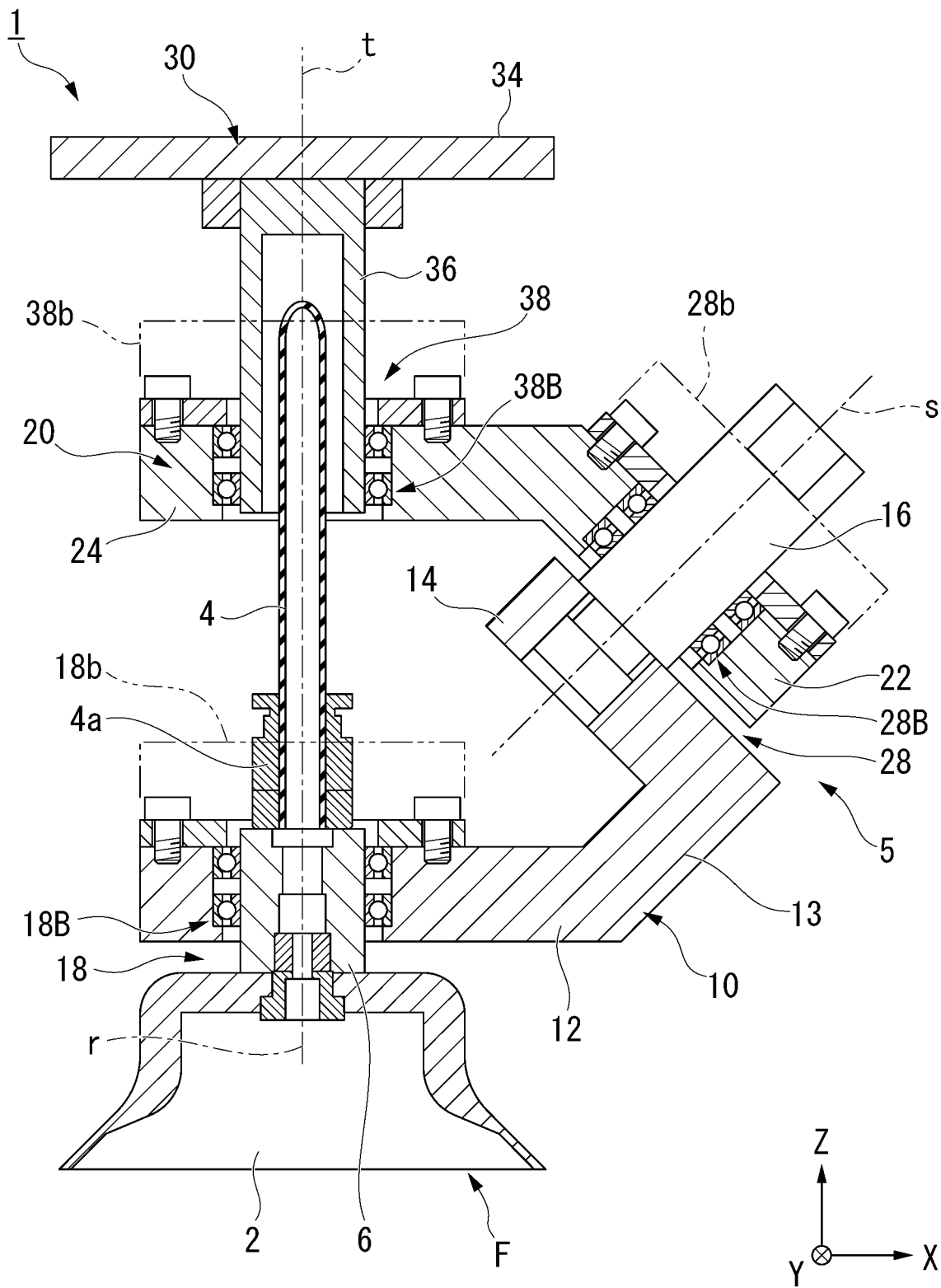
FIG. 3 is a cross-sectional view taken along line in FIG. 5.

FIG. 2 is a side view of the holding device 1 according to the embodiment. FIG. 3 is a cross-sectional view of the holding device 1 taken along line in FIG. 5. As illustrated in FIG. 2, the holding device 1 includes the suction pad 2, a tube member 4, and a support mechanism 5.

The suction pad 2 is made of an elastic material such as rubber. The suction pad 2 is formed in a bell shape and is open in a −Z direction. A suction surface F is defined by an opening surface of the suction pad 2. The suction pad 2 has a shaft 6 extending in the +Z direction (refer to FIG. 3). A central axis of the shaft 6 is arranged coaxially with a central axis of the suction pad 2.

Figure 11:
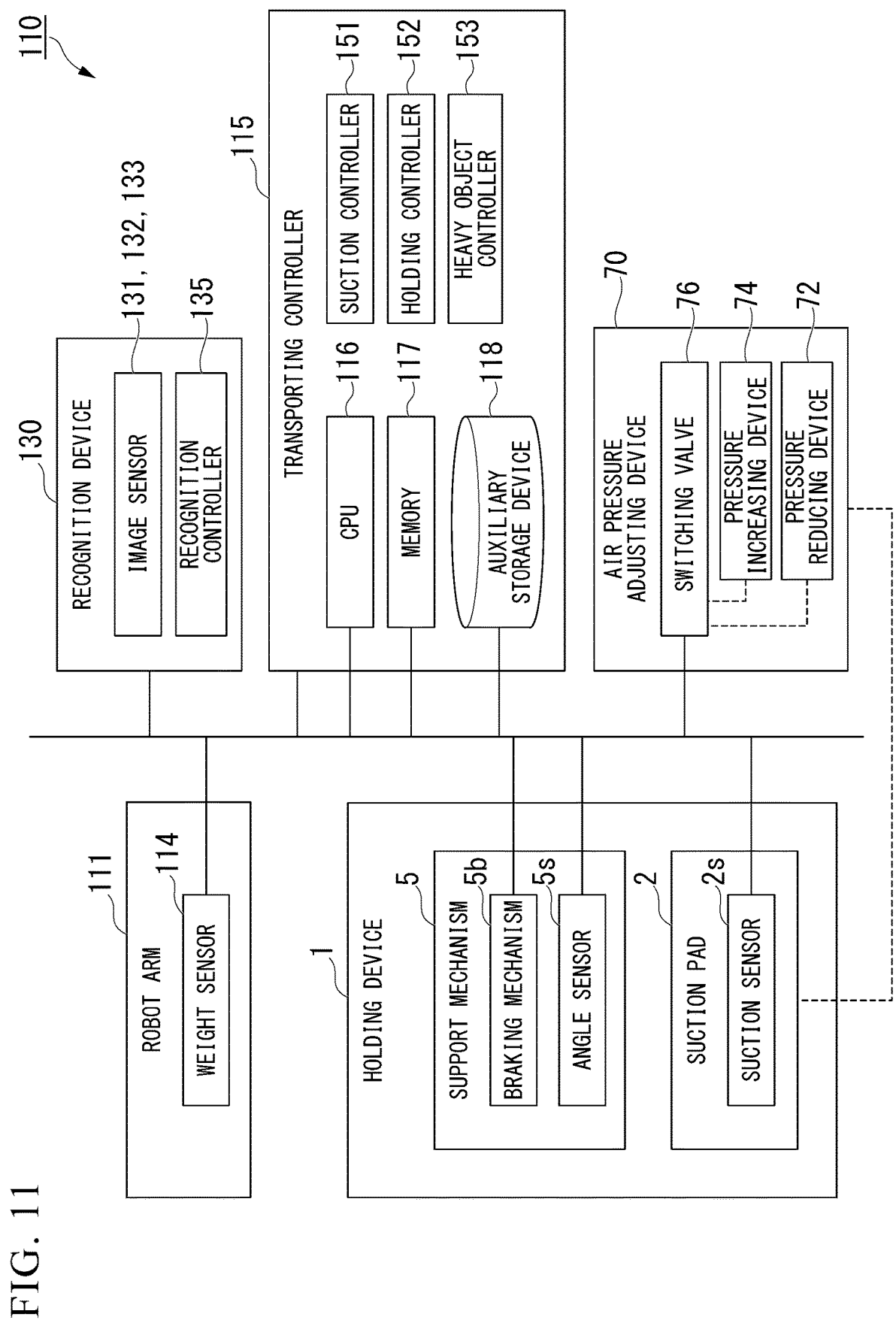
FIG. 11 is a block diagram of the transporting device according to the embodiment.

The suction pad 2 includes a suction sensor 2s (refer to FIG. 11). The suction sensor 2s outputs a suction signal corresponding to a suction state of the suction pad 2. The suction sensor 2s is a pressure sensor, a distance sensor, a flow rate sensor, or the like. The pressure sensor outputs a pressure signal corresponding to a pressure inside the suction pad 2. The distance sensor outputs a distance signal corresponding to a distance from the suction pad 2 to the goods G. The flow rate sensor outputs a flow rate signal corresponding to an air flow rate inside the suction pad 2. Suction states of the goods G using the suction pad 2 is detected on the basis of a suction signal such as the pressure signal, the distance signal, and the flow rate signal.

The tube member 4 is made of an elastic material such as rubber. The tube member 4 is disposed in the +Z direction of the suction pad 2 and extends in the Z direction. An end portion of the tube member 4 in the −Z direction is connected to the shaft 6 of the suction pad 2 with a lower joint 4a therebetween. The tube member 4 communicates with the inside of the suction pad 2. The tube member 4 extends linearly from the lower joint 4a toward a shaft 36 of a base 30. A tube member passage is formed in the shaft 36 of the base 30 and the tube member 4 is inserted into the tube member passage. The tube member 4 may be inserted into the tube member passage in a state in which the tube member 4 can move relative to the shaft 36 and may be fixed to the shaft 36. The tube member 4 extends along the robot arm 111 (refer to FIG. 1) and is connected to the air pressure adjusting device 70 which will be described later.

The support mechanism 5 is disposed in the +Z direction of the suction pad 2. The support mechanism 5 supports the suction pad 2 at an end portion thereof in the −Z direction. The support mechanism 5 can tilt the suction surface F of the suction pad 2, to conform with the tilted state of suction target surfaces of the goods G.

The support mechanism 5 includes a plurality of constituent members 10, 20, and 30. The suction pad 2 and the plurality of constituent members 10, 20, and 30 are connected to each other in series with a plurality of connecting sections 18, 28, and 38 therebetween. The plurality of connecting sections 18 to 38 can freely rotate the suction pad 2 and the plurality of constituent members 10 and 20 so that the suction pad 2 and the plurality of constituent members 10 and 20 can freely rotate around a plurality of rotation axes r, s, and t.

The support mechanism 5 includes a first link 10, a second link 20, and the base 30 as the plurality of constituent members 10, 20, and 30. The support mechanism 5 includes a first connecting section 18, a second connecting section 28, and a third connecting section 38 as the plurality of connecting sections 18, 28, and 38. The support mechanism 5 includes an r axis (a first rotation axis), an s axis (a second rotation axis), and a t axis (a third rotation axis) as the plurality of rotation axes r, s, and t. The first connecting section 18 connects the suction pad 2 to the first link 10 so that the suction pad 2 and the first link 10 can freely rotate around the r axis. The second connecting section 28 connects the first link 10 to the second link 20 so that the first link 10 and the second link 20 can freely rotate around the s axis. The third connecting section 38 connects the second link 20 to the base 30 so that the second link 20 and the base 30 can freely rotate around the t axis. As will be described later, the t axis and the r axis are parallel to each other and the t axis and the s axis are not parallel to each other.

As illustrated in FIG. 3, the first link 10 includes the first end portion 12, an intermediate section 13, the second end portion 14, and the shaft 16. The first end portion 12, the intermediate section 13, and the second end portion 14 are each made of a metal material or the like in a flat plate shape.

The first end portion 12 is arranged perpendicular to the r axis. The first end portion 12 has a through hole passing therethrough in the Z direction. The first connecting section 18 includes a rolling bearing 18B having the r axis as a central axis. An outer ring of the rolling bearing 18B is fixed to the through hole of the first end portion 12. An inner ring of the rolling bearing 18B is fixed to the shaft 6 of the suction pad 2. Thus, the first end portion 12 is connected to the suction pad 2 so that the first end portion 12 and the suction pad 2 can freely rotate around the r axis.

The second end portion 14 is arranged perpendicular to the s axis.

The shaft 16 extends from the second end portion 14 in a direction of the second link 20 parallel to the s axis.

The intermediate section 13 connects an end portion of the first end portion 12 in a +X direction to an end portion of the second end portion 14 in the +X direction.

The second link 20 has a first end portion 22 and a second end portion 24. The first end portion 22 and the second end portion 24 are each made of a metal material or the like in a flat plate shape.

The first end portion 22 is arranged perpendicular to the s axis. The first end portion 22 has a through hole passing therethrough parallel to the s axis. The second connecting section 28 includes a rolling bearing 28B having the s axis as a central axis. An outer ring of the rolling bearing 28B is fixed to a through hole of the first end portion 22. An inner ring of the rolling bearing 28B is fixed to the shaft 16 extending from the second end portion 14 of the first link 10. Thus, the first end portion 22 of the second link 20 is connected to the second end portion 14 of the first link 10 so that the first end portion 22 and the second end portion 14 can freely rotate around the s axis.

The second end portion 24 is arranged perpendicular to the t axis. The second end portion 24 has a through hole passing therethrough in the Z direction.

The base 30 includes an attaching plate 34 and the shaft 36. The attaching plate 34 and the shaft 36 are made of a metal material or the like.

The attaching plate 34 is disposed perpendicular to the t axis. The attaching plate 34 is disposed at an end portion of the holding device 1 in the +Z direction. The holding device 1 is attached to the robot arm 111 (refer to FIG. 1) with the attaching plate 34 therebetween.

The shaft 36 extends from the attaching plate 34 in the −Z direction parallel to the t axis. The third connecting section 38 includes a rolling bearing 38B having the t axis as a central axis. An inner ring of the rolling bearing 38B is supported by the shaft 36. An outer ring of the rolling bearing 38B is supported by the through hole of the second end portion 24 of the second link 20. Thus, the shaft 36 of the base 30 is connected to the second end portion 24 of the second link 20 so that the shaft 36 and the second end portion 24 can freely rotate around the t axis.

The tube member passage into which the tube member 4 is inserted is formed inside the shaft 36. The tube member passage extends in the +Z direction from an end portion in the −Z direction of the shaft 36. The tube member passage is bent in the Y direction and is open in an outer circumferential surface of the shaft 36.

Figure 4:
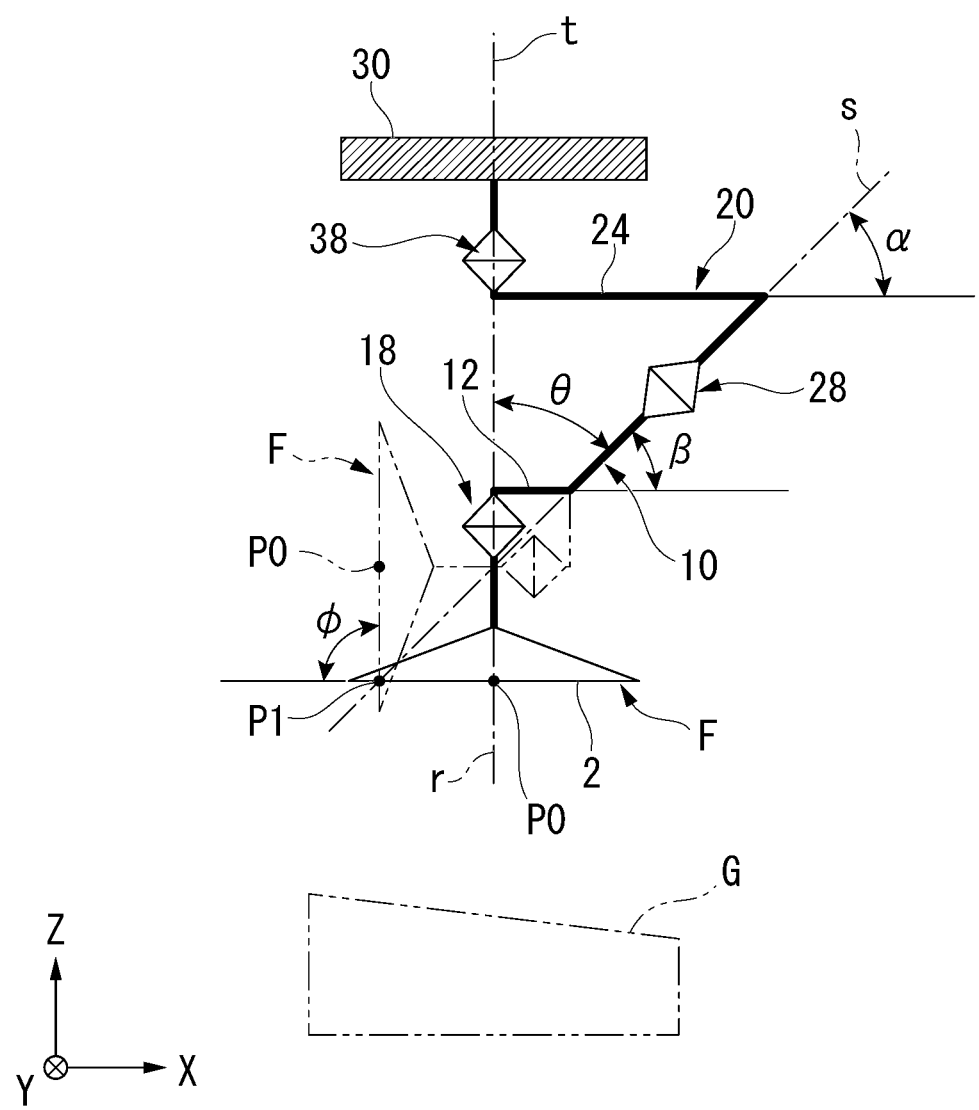
FIG. 4 is a first explanatory diagram of an imitation motion of a suction pad in the holding device.

FIG. 4 is a model diagram of the holding device 1. In FIG. 4, description associated with the tube member will be omitted. In FIG. 4, the first connecting section 18 is arranged along the r axis, the second connecting section 28 is arranged along the s axis, and the third connecting section 38 is arranged along the t axis. The first connecting section 18 is connected to the second connecting section 28 using a line corresponding to the first link 10. The second connecting section 28 is connected to the third connecting section 38 using a line corresponding to the second link 20. The holding device 1 is constituted using an elastic tube member as one node in a three-node closed link mechanism. The first link 10 and the second link 20 disposed between the first connecting section 18 and the third connecting section 38 can rotate in the first connecting section 18 and the third connecting section 38.

A shape of the line corresponding to each link 10 or 20 does not correspond to an actual shape of each link 10 or 20. Each link 10 or 20 can have any shape.

As described above, the second end portion 24 of the second link 20 is disposed perpendicular to the t axis. An intersection angle between the second end portion 24 of the second link 20 and the s axis is assumed to be α. As described above, the first end portion 12 of the first link 10 is disposed perpendicular to the r axis. An intersection angle between the first end portion 12 of the first link 10 and the s axis is assumed to be β. At this time, the angle α is equal to the angle β. Furthermore, it is desirable that the angle α and the angle β be acute angles greater than 0° and smaller than 90°. Thus, the s axis intersects the suction surface F at an intersection point P1 near a central point P0 of an opening in the suction pad 2.

In an unloaded state in which the suction pad 2 does not suction the goods G, the t axis and the r axis are parallel to each other. On the other hand, the t axis and the s axis are not parallel to each other. The t axis and the s axis may intersect each other or be in a position of being twisted from each other. In this embodiment, the t axis intersects the s axis at an angle θ in the −Z direction from the second connecting section 28.

In an unloaded state, the suction surface F is parallel to an XY plane. The r axis, the s axis, and the t axis intersect the suction surface F. The suction surface F means not only an opening surface inside the suction pad 2 but also the entire plane including the opening surface and extending into and outside of the suction pad 2.

The r axis coincides with the central axis of the suction pad 2. For this reason, the r axis intersects the suction surface F at the central point P0 of the opening in the suction pad 2. The r axis is parallel to the Z direction.

The t axis is parallel to the Z direction. The t axis and the r axis may be coaxial or non-coaxial. In this embodiment, the t axis and the r axis can be arranged coaxially. At this time, the t axis intersects the suction surface F at the central point P0 of the opening in the suction pad 2.

The s axis intersects the suction surface F when the r axis and the t axis are coaxial. The s axis intersects the suction surface F at the intersection point P1 different from the central point P0. The intersection point P1 may be inside the opening of the suction pad 2. As will be described later, the s axis may intersect the suction surface F at the central point P0. As described above, the angle α and the angle β are acute angles. For this reason, the s axis intersects the suction surface F at the intersection point P1 near the central point P0.

A tiltable range of the suction surface F in the suction pad 2 will be described.

From the state of FIG. 4, the first link 10 is rotated 180° in the second connecting section 28. Thus, the suction pad 2 rotates around the s axis. The suction surface F after the suction pad 2 rotates is tilted at an angle φ with respect to the XY plane. The angle γ is twice the angle θ. In a process in which the suction pad 2 rotates, a tilting angle of the suction surface F continuously changes from 0 to φ. In a process in which the suction pad 2 rotates, the tube member 4 elastically deforms. By adjusting a length of the tube member 4 in advance, an angle range in which the suction surface F can be tilted is also defined in advance.

Subsequently, the second link 20 is rotated in the third connecting section 38. Thus, in a state in which the suction surface F is tilted, the suction pad 2 rotates around the t axis.

As described above, the suction surface F can be tilted at an arbitrary angle from 0 to φ with respect to the XY plane at an arbitrary position around the t axis.

A case in which the holding device 1 is moved downward toward a tilted surface of each of the goods G illustrated in FIG. 4 can be considered. A portion of the suction pad 2 near the intersection point P1 is in contact with an upper part of the tilted surface of each of the goods G. On the other hand, the suction pad 2 rotates around the s axis so that the suction surface F of the suction pad 2 is tilted to conform with the tilted surface of each of the goods G. Accordingly, a portion of the suction pad 2 near the intersection point P1 is arranged at a lower part of the tilting of the suction surface F. Here, the suction pad 2 can rotate around the r axis in the first connecting section 18. Thus, the portion of the suction pad 2 near the intersection point P1 can move above the tilting of the suction surface F. Therefore, it is possible to tilt the suction surface F of the suction pad 2 to conform with the tilted surface of each of the goods G while the portion of the suction pad 2 near the intersection point P1 is in contact with the upper part of the tilted surface of each of the goods G.

As described above, the s axis intersects the suction surface F at the intersection point P1 near the central point P0 of the suction pad 2. For this reason, in a process in which the suction pad 2 rotates around the s axis and the tilting angle of the suction surface F changes, an amount of movement of the central point P0 in the suction pad 2 is small. That is to say, an amount of movement of the suction pad 2 accompanying an imitation motion of the suction pad 2 is small. Therefore, the suction pad 2 can suction a desired position on each of the goods G.

Figure 5:
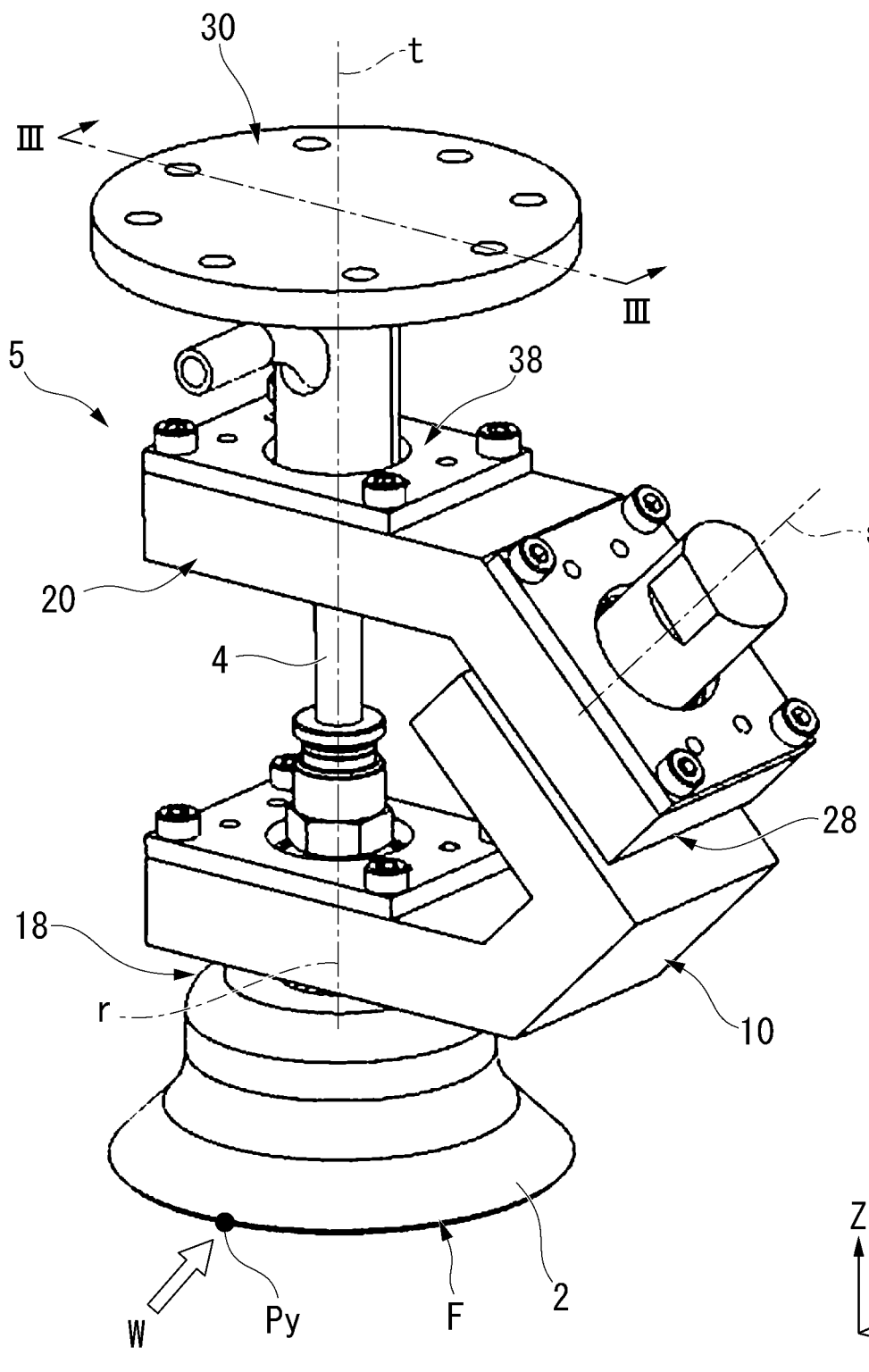
FIG. 5 is a second explanatory diagram of an imitation motion of the suction pad in the holding device.
Figure 6:
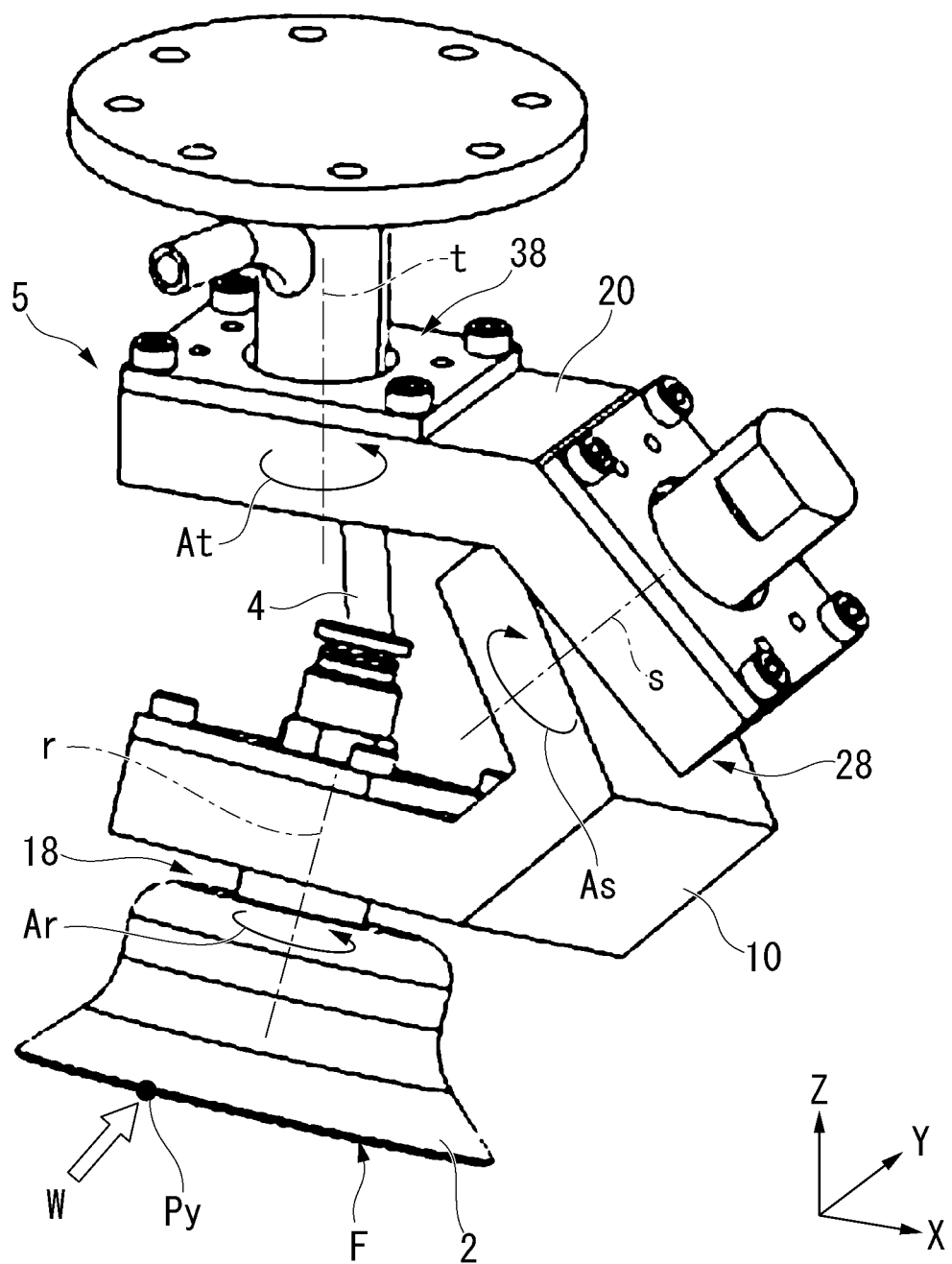
FIG. 6 is a model diagram of the holding device.

FIG. 5 is a first explanatory diagram of an imitation motion of the suction pad 2 in the holding device 1. FIG. 6 is a second explanatory diagram. FIG. 5 and FIG. 6 are perspective views of the holding device 1. As described above, the support mechanism 5 can tilt the suction surface F of the suction pad 2 following the tilted state of the suction target surface in each of the goods G A case in which the tilted surface of each of the goods G is tilted in the −Z direction toward the +Y direction is assumed. If the holding device 1 is moved downward in the −Z direction, an end point Py of the suction pad 2 in the −Y direction illustrated in FIG. 5 is initially in contact with the tilted surface of each of the goods G. The end point Py receives a force W in the +Y direction and the +Z direction from the tilted surface of each of the goods G.

As illustrated in FIG. 6, the second link 20 rotates around the t axis in a direction of an arrow At. The first link 10 rotates around the s axis in a direction of an arrow As. The suction pad 2 rotates around the r axis in a direction of an arrow Ar. When the holding device 1 is moved downward, these rotations occur simultaneously. Thus, the suction surface F of the suction pad 2 is tilted in the −Z direction toward the +Y direction following the tilted surface of each of the goods G The end point Py which is initially in contact with the tilted surface of each of the goods G remains at a position (or the vicinity thereof) in which the end point Py is initially in contact with the tilted surface. As described above, the support mechanism 5 can tilt the suction surface F of the suction pad 2 following the tilted state of the suction target surface in each of the goods G That is to say, an imitation motion of the suction pad 2 is realized simply by a downward moving motion of the holding device 1.

As illustrated in FIG. 5, in each of the connecting sections 18, 28, and 38, a rotating member is supported by a support member. The rotating members are the suction pad 2 for the first connecting section 18, the first link 10 for the second connecting section 28, and the second link 20 for the third connecting section 38. The support members are the first link 10 for the first connecting section 18, the second link 20 for the second connecting section 28, and the base 30 for the third connecting section 38. The tube member 4 is disposed between the suction pad 2 which is the rotating member for the first connecting section 18 and the base 30 which is the support member for the third connecting section 38. The tube member 4 defines an initial posture of each rotating member in an unloaded state.

With an imitation motion of the suction pad 2, the suction pad 2, the first link 10, and the second link 20 rotate. Accordingly, as illustrated in FIG. 6, the tube member 4 elastically deforms. If the suction pad 2 is separated from the goods G, the suction pad 2, the first link 10, and the second link 20 return to the initial posture due to a restoring force of the tube member 4. In order to assist the restoring force of the tube member 4, an elastic member may be disposed in each of the connecting sections 18, 28, and 38. The elastic member is a torsion spring, a plunger, or the like.

Figure 7:
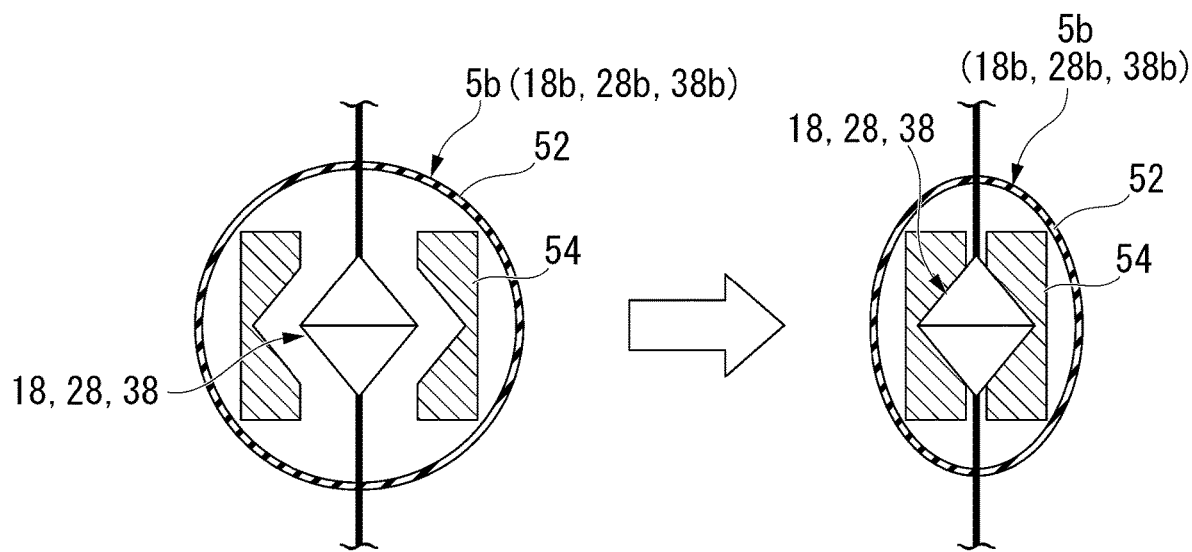
FIG. 7 is a schematic constitution diagram of a braking mechanism.

FIG. 7 is a schematic constitution diagram of a braking mechanism 5b. The support mechanism 5 includes the braking mechanism 5b which stops a tilting motion of the suction surface F of the suction pad 2. The braking mechanism 5b is installed in each of the connecting sections 18, 28, and 38. The braking mechanism 5b operates using air pressure. The braking mechanism 5b is a chuck type (a gripper type) braking mechanism. The braking mechanism 5b includes a bag body 52 and a chuck 54 as a regulating member.

The bag body 52 is formed of an elastic sheet or the like. The bag body 52 covers each of the connecting sections 18 to 38 in an airtight manner. The inside of the bag body 52 communicates with an air pressure adjusting device different from the air pressure adjusting device 70. The bag body 52 can expand and contract using air pressure. The inside of the bag body 52 may communicate with the tube member 4. In this case, the inside of the bag body 52 communicates with the air pressure adjusting device 70 in the same manner as in the tube member 4.

The regulating member is disposed inside the bag body 52. The regulating member comes into close contact with each of the connecting sections 18 to 38 due to the contraction of the bag body 52 to regulate the rotation of the rotating member. For example, the regulating member is the chuck 54. The chuck 54 is made of a metal material or the like. Grooves or ridges due to knurling or the like may be formed in a surface of the chuck 54 coming into contact with each of the connecting sections 18 to 38.

If the air pressure adjusting device reduces the pressure inside the bag body 52, the bag body 52 contracts. The chuck 54 sealed inside the bag body 52 is in close contact with the surroundings of each of the connecting sections 18 to 38. Thus, the movement of the plurality of connecting sections 18 to 38 is restricted and the rotation of the rotating member is regulated.

As illustrated in FIG. 3, the braking mechanism 5b includes a first braking mechanism 18b, a second braking mechanism 28b, and a third braking mechanism 38b.

The first braking mechanism 18b is disposed in the first connecting section 18. The first braking mechanism 18b is installed at the first end portion 12 of the first link 10 and is in close contact with the lower joint 4a connected to the suction pad 2. The first braking mechanism 18b regulates the rotation of the suction pad 2.

The second braking mechanism 28b is disposed in the second connecting section 28. The second braking mechanism 28b is installed at the first end portion 22 of the second link 20 and is in close contact with the shaft 16 of the first link 10. The second braking mechanism 28b regulates the rotation of the first link 10.

The third braking mechanism 38b is disposed in the third connecting section 38. The third braking mechanism 38b is installed at the second end portion 24 of the second link 20 and is in close contact with the shaft 36 of the base 30. The third braking mechanism 38b regulates the rotation of the second link 20.

In this way, the braking mechanism 5b illustrated in FIG. 7 restricts the movement of each of the connecting sections 18 to 38. Thus, the rotation of the suction pad 2, the first link 10, and the second link 20 is regulated and thus the tilting motion of the suction surface F stops.

The support mechanism 5 stops the tilting motion of the suction surface F in a state in which the braking mechanism 5b is being operated. The support mechanism 5 can freely tilt the suction surface F in a state in which the braking mechanism 5b is not being operated.

The support mechanism 5 may include an angle sensor 5s in each of the connecting sections 18 to 38 (refer to FIG. 11). The angle sensor 5s outputs an angle signal corresponding to a rotation angle of the rotating member around each of the rotation axes r, s, and t. The angle sensor 5s is a potentiometer, an encoder, a photointerrupter, or the like. A tilting angle of the suction surface F is calculated on the basis of the angle signal output from the angle sensor 5s. Furthermore, a failure of the braking mechanism 5b is detected on the basis of the angle signal.

A motion of the holding device 1 will be described.

Figure 8:
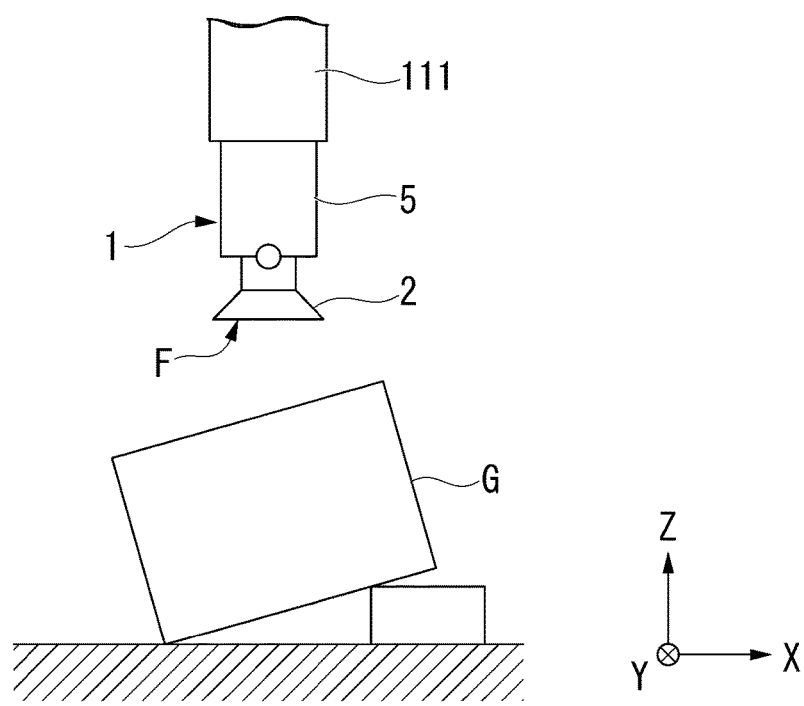
FIG. 8 is a first explanatory diagram of a holding motion of the holding device.
Figure 9:
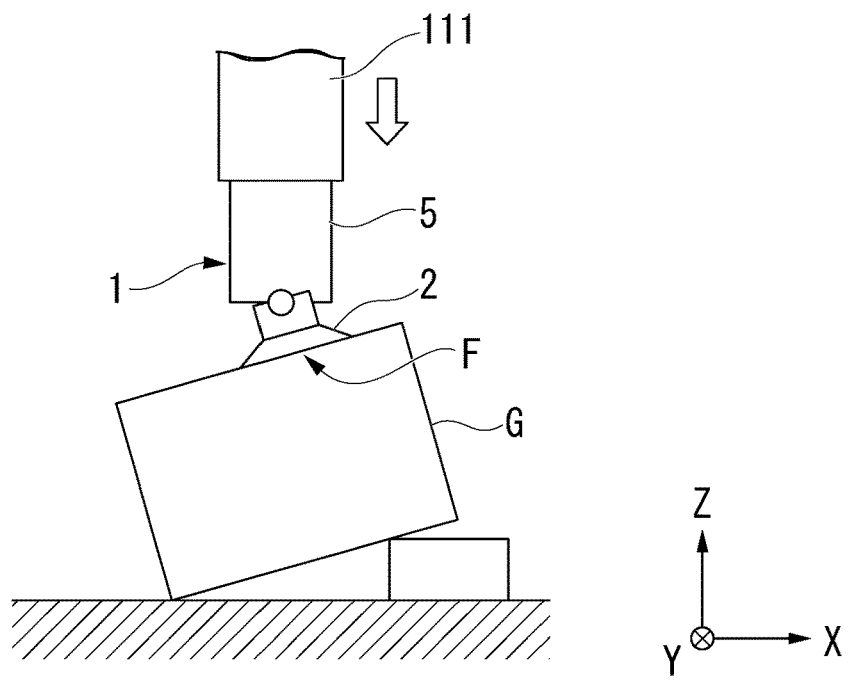
FIG. 9 is a second explanatory diagram of a holding motion of the holding device.
Figure 10:
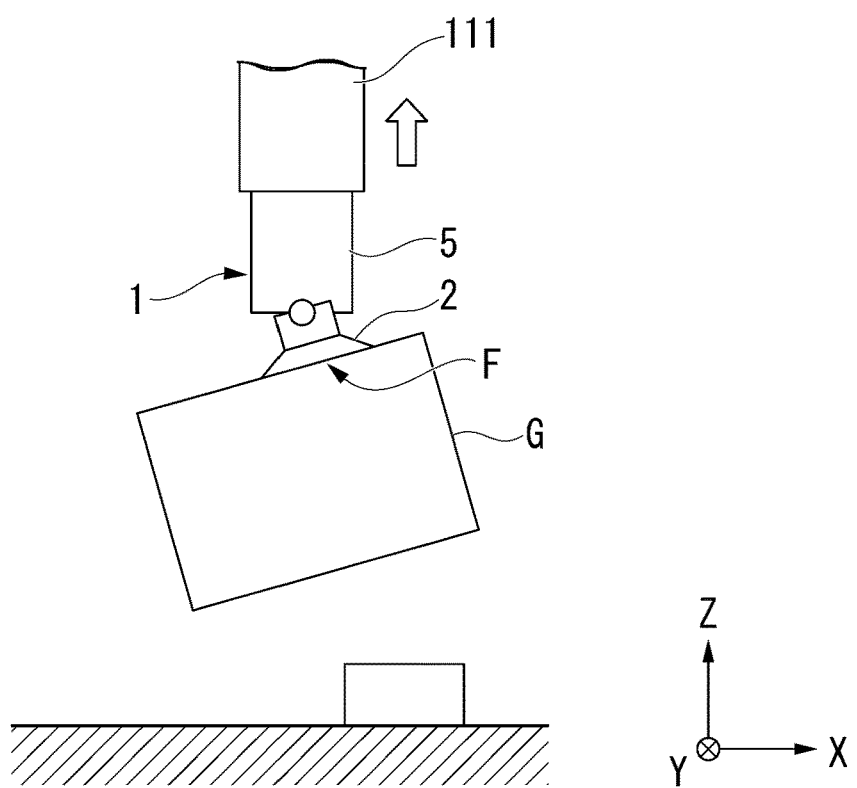
FIG. 10 is a third explanatory diagram of a holding motion of the holding device.

FIG. 8 is a first explanatory diagram of a holding motion of the holding device 1. FIG. 9 is a second explanatory diagram. FIG. 10 is a third explanatory diagram.

As illustrated in FIG. 8, the holding device 1 moves downward toward the goods G in the −Z direction. The holding device 1 approaches the goods G in a state in which the braking mechanism 5b is not being operated. An upper surface of each of the goods G is tilted.

As illustrated in FIG. 9, the holding device 1 comes into contact with each of the goods G The braking mechanism 5b of the holding device 1 is not being operated. The suction pad 2, the first link 10, and the second link 20 can rotate around each of the rotation axes r, s, and t. The suction surface F is tilted following the tilting of the upper surface of each of the goods G. The suction surface F is arranged along the upper surface of each of the goods G If the pressure inside the suction pad 2 is reduced, the suction surface F suctions the upper surface of each of the goods G.

As illustrated in FIG. 10, the holding device 1 moves upward in the +Z direction while suctioning the goods G Thus, the holding device 1 holds the goods G. The support mechanism 5 supports weights of the goods G. The tube member 4 does not support the weights of the goods G. Therefore, the holding device 1 holds the goods G in a stable state.

FIG. 11 is a block diagram of the transporting device according to the embodiment. As described above, the transporting device 110 includes the robot arm 111, the holding device 1, the air pressure adjusting device 70, and the transporting controller 115.

The robot arm 111 includes a weight sensor 114. The weight sensor 114 is disposed between the robot arm 111 and the holding device 1. The weight sensor 114 outputs weight signals corresponding to the weights of the goods G held by the holding device 1.

The air pressure adjusting device 70 includes a pressure reducing device 72, a pressure increasing device 74, and a switching valve 76.

The pressure reducing device 72 reduces a pressure of air to a pressure lower than atmospheric pressure. The pressure reducing device 72 is a vacuum pump or the like.

The pressure increasing device 74 increases a pressure of air to a pressure higher than atmospheric pressure. The pressure increasing device 74 is a compressor or the like.

The switching valve 76 switches a communication destination of the suction pad 2 between the pressure reducing device 72 and the pressure increasing device 74. The switching valve 76 can also cut off communication of the suction pad 2 with respect to the pressure reducing device 72 and the pressure increasing device 74.

As described above, the recognition device 130 recognizes states of the goods G The recognition device 130 recognizes suction states and holding states of the goods G using the holding device 1. The recognition device 130 includes the plurality of image sensors 131, 132, and 133 and the recognition controller 135.

The plurality of image sensors 131 to 133 capture images of the goods G or the holding device 1 having the goods G held therein through suction. The plurality of image sensors 131 to 133 transmit the captured image data to the recognition controller 135. The recognition controller 135 analyzes the image data and recognizes states such as positions or postures of the goods G The recognition controller 135 transmits goods information concerning the states of the goods G to the transporting controller 115.

The recognition controller 135 analyzes the image data and recognizes suction states of the goods G using the holding device 1. The recognition controller 135 recognizes the suction state from a shape and the like of a suction pad of the holding device 1. The recognition controller 135 transmits suction information concerning the suction states of the goods G to the transporting controller 115.

The recognition controller 135 analyzes the image data and recognizes holding states of the goods G using the holding device 1. The recognition controller 135 recognizes the holding state from postures of the goods G lifted up while held by the holding device 1, a shape of the suction pad, or the like. The recognition controller 135 transmits holding information concerning the holding states of the goods G to the transporting controller 115.

The transporting controller 115 is a microcomputer including a processor such as a central processing unit (CPU) 116. For example, the transporting controller 115 may be realized using a processor such as the CPU 116 configured to execute a program stored in a memory 117 or an auxiliary storage device 118. Furthermore, a part or all of the transporting controller 115 may be realized using hardware such as a large scale integration (LSI), an application specific integrated circuit (ASIC), and a field-programmable gate array (FPGA) and may be realized through cooperation of software and hardware.

The transporting controller 115 controls motions of the robot arm 111, the holding device 1, and the air pressure adjusting device 70. The transporting controller 115 controls the motion of the robot arm 111 such that the holding device 1 is moved to an arbitrary position. The transporting controller 115 controls the motions of the holding device 1 and the air pressure adjusting device 70 such that the goods G are held and released. The transporting controller 115 performs switching of the switching valve 76 in the air pressure adjusting device 70. The transporting controller 115 selects the pressure reducing device 72 as a communication destination of the suction pad 2 and thus reduces the pressure inside the suction pad 2. Thus, the holding device 1 holds each of the goods G using the suction pad 2. The transporting controller 115 selects the pressure increasing device 74 as a communication destination of the suction pad 2 and thus increases a pressure inside the suction pad 2. Thus, the holding device 1 releases each of the goods G from the suction pad 2.

The transporting controller 115 includes a suction controller 151, a holding controller 152, and a heavy object controller 153 as functional units.

The suction controller 151 performs control so that the holding device 1 appropriately suctions the goods G. The suction controller 151 detects a suction state using the suction pad 2 on the basis of the suction signal received from the suction sensor 2s. The suction controller 151 may detect the suction state on the basis of the suction information received from the recognition controller 135. When the suction state is determined to be inappropriate, the suction controller 151 performs the suction motion using the holding device 1 again. That is to say, the suction controller 151 temporarily cancels the suction of the goods G using the suction pad 2. The suction controller 151 moves the holding device 1 to a different place and suctions the goods G again using the suction pad 2. The suction controller 151 determines the suction state again. The suction controller 151 repeatedly performs the above-mentioned process until the suction state is determined to be appropriate.

The suction controller 151 may determines a suction state on the basis of a tilting angle of the upper surface of each of the goods G and an angle of the suction surface F. The tilting angle of the upper surface of each of the goods G suctioned by the suction pad 2 is detected using the goods information output from the recognition controller 135. The angle of the suction surface F is calculated on the basis of the angle signal output from the angle sensor 5s. If the first link 10 or the second link 20 of the support mechanism 5 comes into contact with an obstacle, the suction surface F is not arranged along the upper surface of each of the goods G The angle of the suction surface F in this case is different from the tilting angle of the upper surface of each of the goods G. When a magnitude of a different between the tilting angle of the upper surface of each of the goods G and the angle of the suction surface F is equal to or greater than a predetermined angle, the suction controller 151 determines that the suction state is inappropriate.

The suction controller 151 may move the holding device 1 in accordance with the states of the goods G when performing a suction motion again. The states of the goods G are detected using the goods information output from the recognition controller 135. The suction controller 151 detects a place in which there is no obstacle from the states of the goods G and moves the holding device 1.

Figure 12:
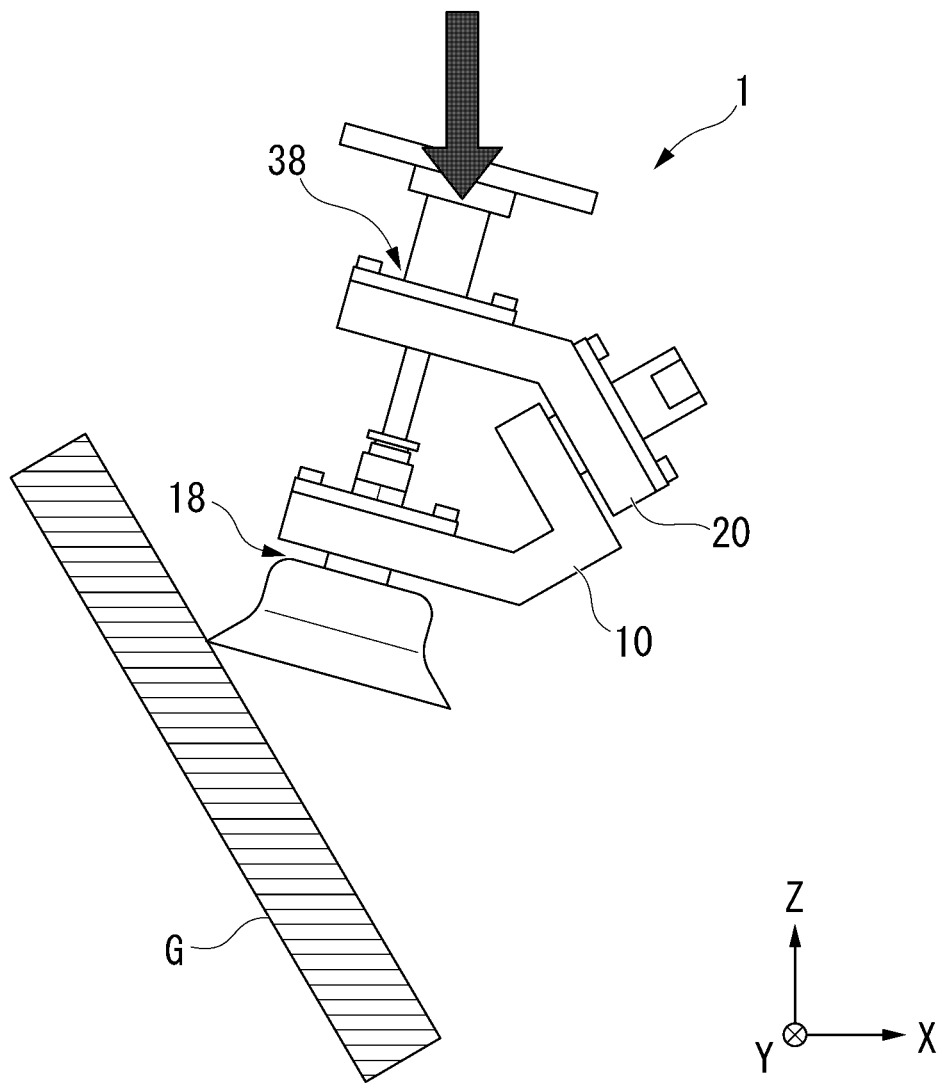
FIG. 12 is an explanatory diagram of a downward moving motion of the holding device.

FIG. 12 is an explanatory diagram of a downward moving motion of the holding device 1. A case in which the holding device 1 is moved down in a state in which the first link 10 and the second link 20 are arranged with respect to goods G having a large tilting angle of an upper surface thereof in directions of the goods G occurs in some cases. In this case, the first link 10 and the second link 20 of the holding device 1 are likely to come into contact with the goods G Thus, the suction pad 2 cannot suction a suction target surface of each of the goods G and thus a suction state thereof is inappropriate. In this case, it is desirable to move down the holding device 1 in a state in which the holding device 1 is tilted so that the suction pad 2 faces the goods G. The first link 10 and the second link 20 rotates in the first connecting section 18 and the third connecting section 38 due to their own weight. As illustrated in FIG. 12, the first link 10 and the second link 20 move to an opposite side from the goods G. Thus, while the holding device 1 is moving down, the contact of the first link 10 and the second link 20 with respect to the goods G is prevented. As a result, the suction pad 2 can appropriately suction a suction target surface of each of the goods G.

The holding controller 152 performs control so that the holding device 1 stably holds the goods G The suction pad 2 suctions a position on each of the goods G in which the suction pad 2 is away from a center of gravity of each of the goods G in some cases. In this state, if the goods G are move up while held, a bending moment or a shearing force acts on the suction pad 2 and thus the goods G are easily detached from the suction pad 2. In this case, the holding device 1 cannot hold the goods G stably.

The holding controller 152 detects a holding state using the holding device 1 on the basis of the suction signal received from the suction sensor 2s. The holding controller 152 may detects the holding state on the basis of the holding information received from the recognition controller 135. The holding controller 152 performs the holding motion using the holding device 1 again when the holding state is determined to be inappropriate. That is to say, the holding controller 152 temporarily cancels the suction of the goods G using the suction pad 2. The holding controller 152 moves the holding device 1 to a different place and suctions the goods G again using the suction pad 2. The holding controller 152 determines a holding state using the holding device 1 again. The holding controller 152 repeatedly performs the above-mentioned process until the holding state is determined to be appropriate.

The holding controller 152 may move the holding device 1 in accordance with the states of the goods G when performing a holding motion again. The states of the goods G are detected using the goods information output from the recognition controller 135. The holding controller 152 estimates a position of a center of gravity of each of the goods G from the states of the goods G and moves the holding device 1.

The heavy object controller 153 performs control so that the holding device 1 stably transports a heavy object. When goods G are heavy objects, postures of the goods G which are being transported are unstable. When the holding device 1 moves up the goods G held therein, the weight sensor 114 outputs weight signals of the goods G. The heavy object controller 153 detects weights of the goods G on the basis of the weight signal received from the weight sensor 114. The heavy object controller 153 determines that the goods G are heavy objects when the weights of the goods G are equal to or greater than a predetermined weight. In this case, the heavy object controller 153 operates the braking mechanism 5b. Thus, since postures of the goods G which are being transported are stable, the holding device 1 stably transports each of the heavy objects.

The heavy object controller 153 may operate the braking mechanism 5b when the goods G are the heavy objects and a transportation speed of the holding device 1 is equal to or greater than a predetermined speed.

A transporting method using the transporting device 110 of the embodiment will be described.

Figure 13:
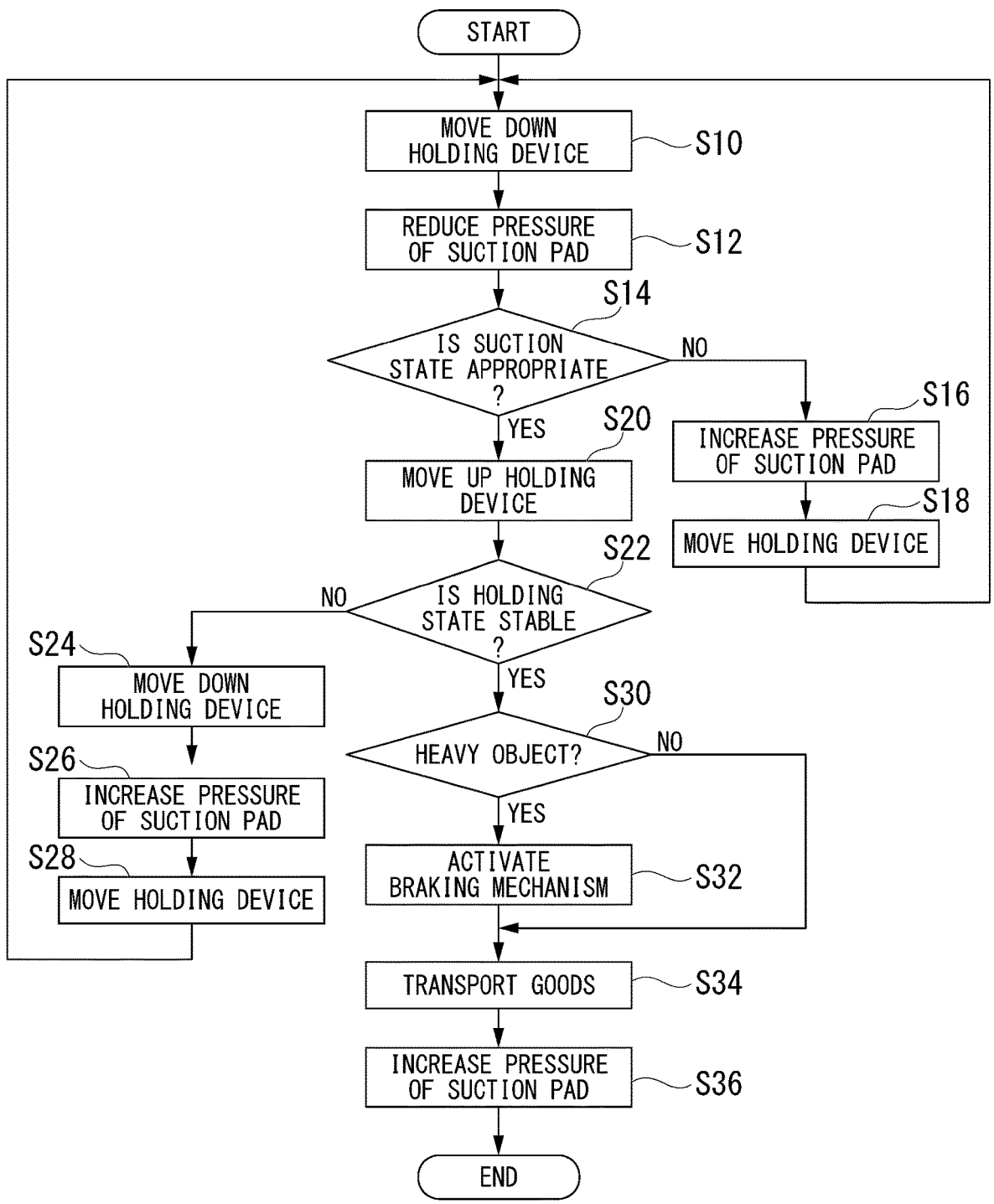
FIG. 13 is a flowchart for describing a transporting method.

FIG. 13 is a flowchart for describing the transporting method.

The transporting controller 115 controls a motion of the robot arm 111 to move down the holding device 1 (S10). As illustrated in FIG. 1, the transporting controller 115 moves down the holding device 1 toward the goods G placed in the goods storage space 120. A moving-down stop position of the holding device 1 is decided using the goods information output from the recognition controller 135. The holding device 1 may detect the contact thereof with the goods G on the basis of the distance signal output from the distance sensor as the suction sensor 2s and stop downward-moving. The holding device 1 comes into contact with the goods G in a state in which the braking mechanism 5b is not operated. The suction surface F of the suction pad 2 is tilted following the tilting of an upper surface of each of the goods G Thus, the suction surface F is arranged along the upper surface of each of the goods G.

The transporting controller 115 controls a motion of the air pressure adjusting device 70 to reduce a pressure of the suction pad 2 (S12). Thus, the suction pad 2 suctions the upper surface of each of the goods G The braking mechanism 5b may be connected to the air pressure adjusting device 70 in the same manner as in the suction pad 2. In this case, the suction pad 2 suctions the goods G, and at the same time, the braking mechanism 5*b* operates.

The suction controller 151 determines whether the suction states of the goods G using the holding device 1 is appropriate (S14). When the determination in S14 is No, the suction controller 151 performs the suction motion using the holding device 1 again. That is to say, the suction controller 151 controls the motion of the air pressure adjusting device 70 to increase a pressure of the suction pad 2 (S16). Thus, the suction pad 2 temporarily releases the goods G. The suction controller 151 controls a motion of the robot arm 111 such that the holding device 1 is moved to a different place (S18). The suction controller 151 performs the suction motion performed in S10 and subsequent steps again. The suction controller 151 repeatedly performs the above-mentioned process until the determination in S14 is Yes. Thus, the goods G are appropriately suctioned.

When the determination in S14 is Yes, the transporting controller 115 controls the motion of the robot arm 111 to move up the holding device 1 (S20). The holding device 1 moves up the goods G held therein in a state in which the braking mechanism 5*b* is not operated. At this time, the support mechanism 5 automatically displaces so that the goods G are most stable. Here, when the suction pad 2 suctions a position of each of the goods G away from a center of gravity thereof, the goods G are held in an unstable state.

The holding controller 152 determines whether holding states of the goods G using the holding device 1 are stable (S22). When the determination in S22 is No, the holding controller 152 performs the holding motion using the holding device 1 again. That is to say, the holding controller 152 controls a motion of the robot arm 111 to move down the holding device 1 (S24). The holding controller 152 increases a pressure of the suction pad 2 and temporarily releases the goods G (S26). The holding controller 152 moves the holding device 1 to a different place (S28). The holding controller 152 performs the suction motion and the holding motion performed in S10 and subsequent steps again. The holding controller 152 repeatedly performs the above-mentioned process until the determination in S22 is Yes. Thus, the goods G are stably held.

When the determination in S22 is Yes, the heavy object controller 153 determines that the goods G are heavy objects equal to or greater than a predetermined weight (S30). When the determination in S30 is Yes, the heavy object controller 153 operates the braking mechanism 5*b*. Thus, the goods G are stably transported.

The transporting controller 115 controls the motion of the robot arm 111 to transport the goods G held by the holding device 1 (S34). As illustrated in FIG. 1, the transporting controller 115 transports the goods G to a transportation destination such as the conveyor 140. The transporting controller 115 controls the motion of the air pressure adjusting device 70 to increase a pressure of the suction pad 2 (S36). Thus, the suction pad 2 releases the goods G above the conveyor 140.

As described above, the process of the transporting method end.

As described in detail above, the holding device 1 in the embodiment includes the suction pad 2, the first link 10, the second link 20, the base 30, and the tube member 4. The first link 10 supports the suction pad 2 so that the suction pad 2 can freely rotate around the r axis. The second link 20 supports the first link 10 so that the first link 10 can freely rotate around the s axis. The base 30 supports the second link 20 so that the second link 20 can freely rotate around the t axis. The tube member 4 communicates with the inside of the suction pad 2 and passes over the base 30. The s axis and the t axis are not parallel to each other.

Thus, if the suction pad 2 comes into contact with the tilted surface of each of the goods G, the suction surface F of the suction pad 2 tilts smoothly following the tilted surface of each of the goods G. Therefore, the holding device 1 can hold objects to be held in various state. The holding device 1 realizes an imitation motion of the suction pad 2 with a small number of parts and a simple shaft constitution. Therefore, a size of the holding device 1 is reduced, rigidity of the holding device 1 increases, and durability of the holding device 1 is improved.

The r axis is the central axis of the suction pad 2. The r axis is arranged coaxially with the t axis in an unloaded state in which the suction pad 2 does not suction an object to be held.

Thus, a structure of the holding device 1 is simplified and the holding device 1 is easily produced. Furthermore, the first link 10 and the second link 20 disposed between the first connecting section 18 and the third connecting section 38 can rotate in the first connecting section 18 and the third connecting section 38.

In the above-mentioned unloaded state, the s axis intersects the suction surface F of the suction pad 2.

Thus, an amount of movement of the suction pad 2 accompanied by an imitation motion of the suction pad 2 is reduced. Therefore, the holding device 1 can suction a desired position of each of the goods G.

The holding device 1 includes the tube member 4. The tube member 4 communicates with the inside of the suction pad 2 and passes over the base 30. The tube member 4 can elastically deform along with a change in posture of the suction pad 2, the first link 10, and the second link 20.

With the imitation motion of the suction pad 2, postures of the suction pad 2, the first link 10, and the second link 20 change and thus the tube member 4 elastically deforms. When the suction surface F is separated from the goods G, the suction pad 2, the first link 10, and the second link 20 return to their original postures due to a restoring force of the tube member 4.

The holding device 1 includes the braking mechanism 5*b*. The braking mechanism 5*b* stops the rotation between the suction pad 2, the first link 10, or the second link 20 which is a rotating member and a support member which supports the rotating member.

When the braking mechanism 5*b* is operated, the goods G can be stably transported even when the goods G are heavy objects.

The braking mechanism 5*b* communicates with the tube member 4 and operates using air pressure.

Thus, suction of the goods G using the suction pad 2 is performed, and at the same time, the braking mechanism 5*b* operates. Furthermore, a constitution of the holding device 1 is simplified.

The braking mechanism 5*b* includes the bag body 52 and the chuck 54. The bag body 52 can expand and contract using air pressure. The chuck 54 is disposed inside the bag body 52 and comes into close contact with the rotating member or the support member when the bag body 52 contracts.

Thus, the braking mechanism 5*b* is easily formed.

The transporting device 110 according to the embodiment includes the holding device 1, the air pressure adjusting device 70, the robot arm 111, and the transporting controller 115. The air pressure adjusting device 70 is connected to the tube member 4 and adjusts air pressure of the suction pad 2.

The robot arm 111 moves the holding device 1. The transporting controller 115 controls the holding device 1, the air pressure adjusting device 70, and the robot arm 111 to control suctioning, transporting, and releasing of the goods G using the holding device 1.

The transporting device 110 can transport goods G in various states held therein using the holding device 1.

The holding device 1 includes the braking mechanism 5b. The braking mechanism 5b stops the rotation between the suction pad 2, the first link 10, or the second link 20 which is a rotating member and a support member which supports the rotating member. The transporting controller 115 suctions the goods G while the suction surface F of the suction pad 2 is brought into contact with the goods G in a state in which the braking mechanism 5b is not operated. The transporting controller 115 moves up the goods G held therein in a state in which the braking mechanism 5b is not operated. The transporting controller 115 transports the goods G in a state in which the braking mechanism 5b has been operated.

By not operating the braking mechanism 5b, when the suction surface F is brought into contact with the goods G, the suction surface F automatically tilts following the tilting of a surface of each of the goods G When the goods G are held and moved up, the suction pad 2, the first link 10, or the second link 20 automatically rotate so that the goods G are most stable. By operating the braking mechanism 5b, when the goods G are transported, the goods G are transported in a stable state.

When weights of the goods G are equal to or greater than a predetermined weight, the transporting controller 115 operates the braking mechanism 5b.

Thus, when the goods G are heavy objects, the goods G are transported in a stable state.

The holding device 1 includes the angle sensor 5s. The angle sensor 5s outputs an angle signal corresponding to a rotation angle between the suction pad 2, the first link 10, or the second link 20 which is a rotating member and a support member which supports the rotating member. The transporting controller 115 detects a tilting angle of the suction surface F in the suction pad 2 on the basis of the angle signal. The transporting controller 115 performs the suction motion of the goods G again using the holding device 1 when a magnitude of a difference between a tilting angle of the surface of the goods G suctioned by the suction pad 2 and a tilting angle of the suction surface F is equal to or greater than a predetermined value.

When a magnitude of an angle difference is equal to or greater than a predetermined angle, suction states of the goods G using the holding device 1 are inappropriate. When the goods G are suctioned again, the suction states of the goods G are appropriate.

Modified examples of the embodiment will be described. A description of constituent elements in the modified examples that are the same as those of the above-described embodiment will be omitted.

Figure 14:
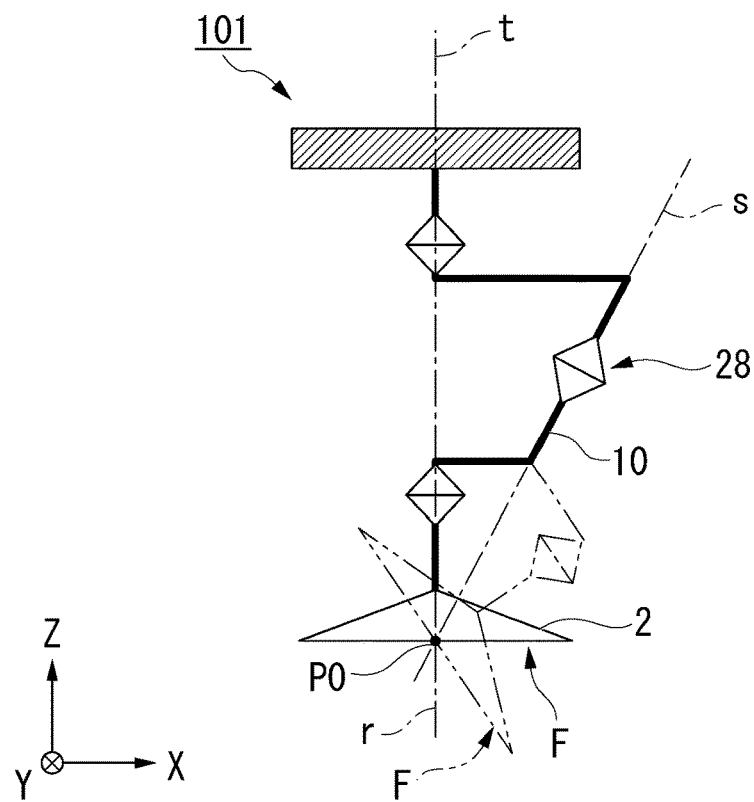
FIG. 14 is a model diagram of the holding device according to a first modified example.

FIG. 14 is a model diagram of a holding device 101 of a first modified example.

In the first modified example, an s axis intersects the r axis and the t axis on a suction surface F of a suction pad 2 when the r axis and the t axis are coaxial. As in the above-described embodiment, the r axis and the t axis intersect the suction surface F at a central point P0 of an opening in the suction pad 2. Therefore, the s axis also intersects the suction surface F at the central point P0 of the opening in the suction pad 2.

If a first link 10 rotates in a second connecting section 28, the suction pad 2 rotates around the s axis and the suction surface F tilts. Since the s axis intersects the suction surface F at the central point P0, the central point P0 of the suction pad 2 does not move in a process in which the suction surface F tilts. That is to say, an amount of movement of the suction pad 2 accompanied by an imitation motion of the suction pad 2 is small. Therefore, the suction pad 2 can suction a desired position of each of the goods G Accordingly, the necessity of moving a holding device 101 again using a robot arm 111 (refer to FIG. 1) to arrange the suction pad 2 at a desired position of each of the goods G is reduced.

As described in detail above, the s axis of the holding device 101 in the first modified example intersects the r axis and the t axis at the suction surface F of the suction pad 2 in the unloaded state.

Thus, an amount of movement accompanied by an imitation motion of the suction pad 2 is small. Therefore, the holding device 101 can hold a desired position of an object to be held.

Figure 15:
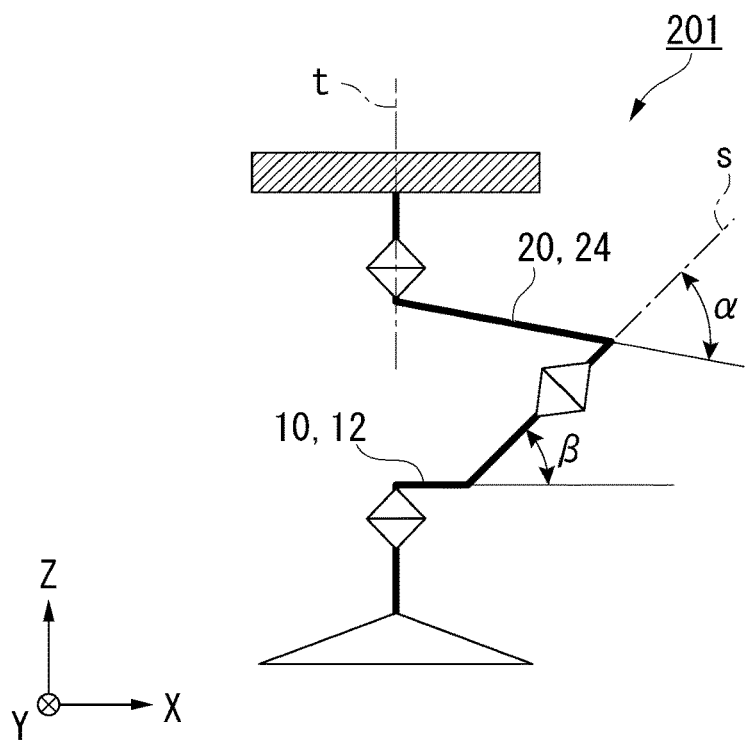
FIG. 15 is a model diagram of the holding device according to a second modified example.

FIG. 15 is a model diagram of a holding device 201 in a second modified example.

In the second modified example, a second end portion 24 of a second link 20 is disposed non-perpendicular to a t axis. An intersection angle between the second end portion 24 of the second link 20 and an s axis is assumed to be α. As in the above-described embodiment, a first end portion 12 of a first link 10 is disposed perpendicular to an r axis. An intersection angle between the first end portion 12 of the first link 10 and the s axis is assumed to be β. At this time, the angle α is different from the angle β.

As described above, the links 10 and 20 can have any shape. Therefore, the holding device 201 in the second modified example has the same effects as in the holding device 1 in the above-described embodiment.

Figure 16:
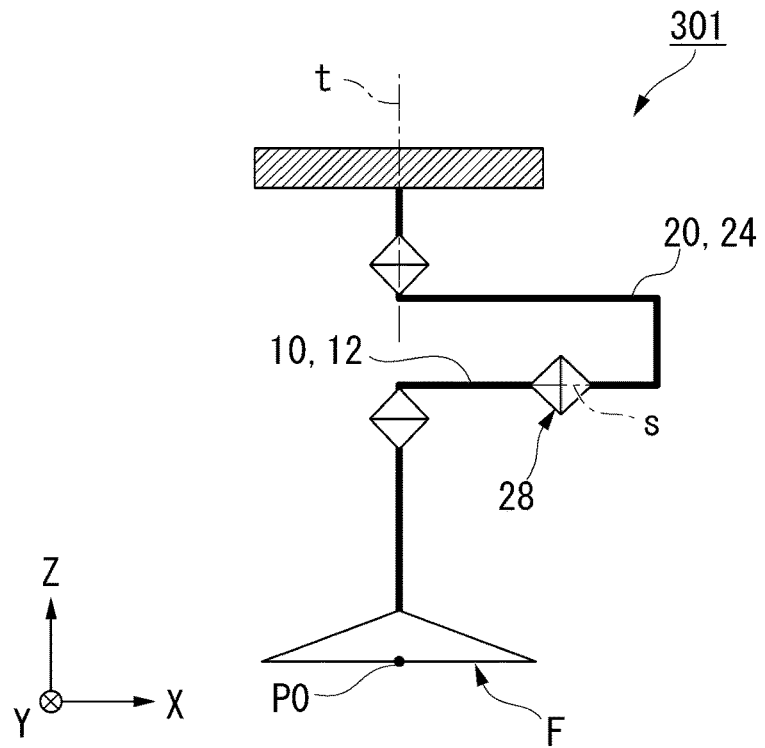
FIG. 16 is a model diagram of the holding device according to a third modified example.

FIG. 16 is a model diagram of a holding device 301 in a third modified example. In the third modified example, an s axis is parallel to the X direction. The s axis does not intersect a suction surface F. The s axis intersects a t axis at the same position in the Z direction as in a second connecting section 28. An intersection angle α between a second end portion 24 of a second link 20 and the s axis is 0°. An intersection angle β between a first end portion 12 of a first link 10 and the s axis is also 0°.

The holding device 301 in the third modified example has the same effects as in the holding device 1 in the above-described embodiment. Here, when the first link 10 rotates in the second connecting section 28 and a suction surface F tilts, an amount of movement of a central point P0 of a suction pad 2 increases.

Figure 17:
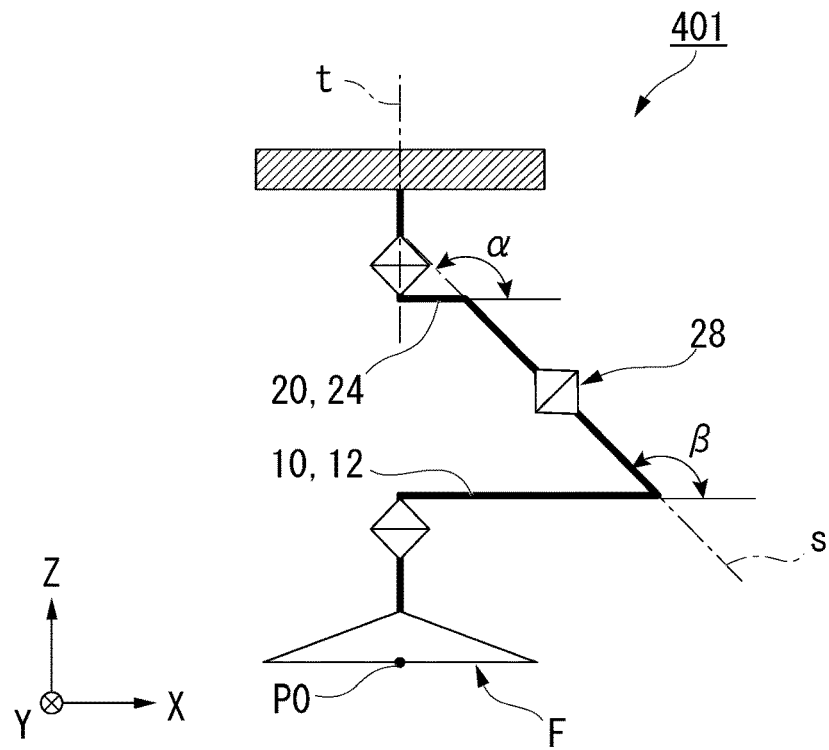
FIG. 17 is a model diagram of the holding device according to a fourth modified example.

FIG. 17 is a model diagram of a holding device 401 in a fourth modified example.

An s axis in the third modified example tilts in a direction opposite to the s axis in the above-described embodiment. The s axis intersects a t axis in the +Z direction from a second connecting section 28. The s axis intersects a suction surface F at a position of a suction pad 2 away from a central point P0 in the +X direction. An intersection angle α between a second end portion 24 of a second link 20 and the s axis is greater than 90°. An intersection angle β between a first end portion 12 of a first link 10 and the s axis is also greater than 90°.

The holding device 401 in the fourth modified example has the same effects as in the holding device 1 in the above-described embodiment. Here, when the first link 10 rotates in the second connecting section 28 and a suction surface F tilts, an amount of movement of a central point P0 of a suction pad 2 increases.

Figure 18:
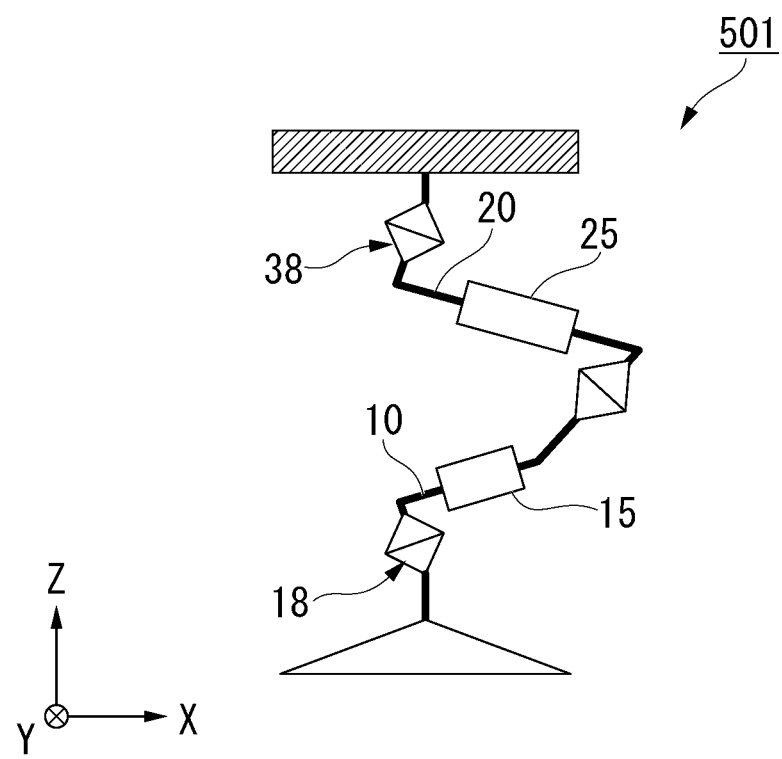
FIG. 18 is a model diagram of the holding device according to a fifth modified example.

FIG. 18 is a model diagram of a holding device 501 in a fifth modified example. In the fifth modified example, a t axis and an r axis are not parallel to each other. A first expansion/contraction member 15 which can expand and contract in a direction in which a first end portion 12 of the first link 10 extends is disposed on the first end portion 12. A second expansion/contraction member 25 which can expand and contract in a direction in which a second end portion 24 of a second link 20 extends is disposed on the second end portion 24. Thus, even when a t axis and an r axis are not parallel to each other, a suction pad 2 can perform an imitation motion.

Figure 19:
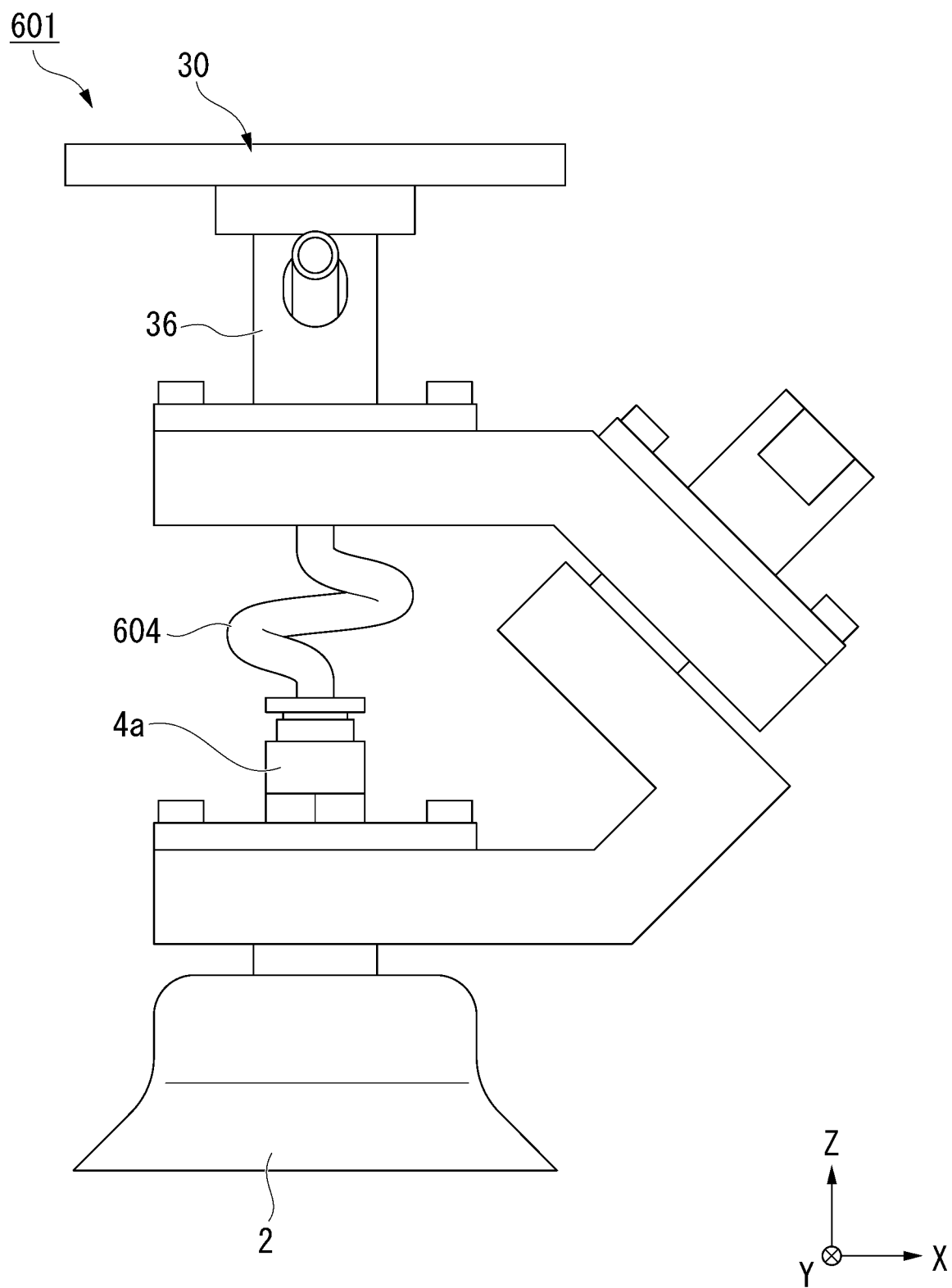
FIG. 19 is a side view of the holding device according to a sixth modified example.

FIG. 19 is a side view of a holding device 601 in a sixth modified example.

In the sixth modified example, a tube member 604 is non-linear. The tube member 604 extends non-linearly from a lower joint 4a toward a shaft 36 of a base 30. For example, the tube member 604 has a spiral shape. The tube member 604 may have other shapes such as a curved shape.

When the tube member 604 is in a non-linear shape, a length of the tube member 604 is increased. The length of the tube member 604 between the lower joint 4a and the shaft 36 is longer than a linear length between the lower joint 4a and the shaft 36. In this case, a tiltable range of a suction surface F of a suction pad 2 is not easily limited by a tube member 604. Therefore, a holding device 601 can hold objects to be held in various states.

Figure 20:
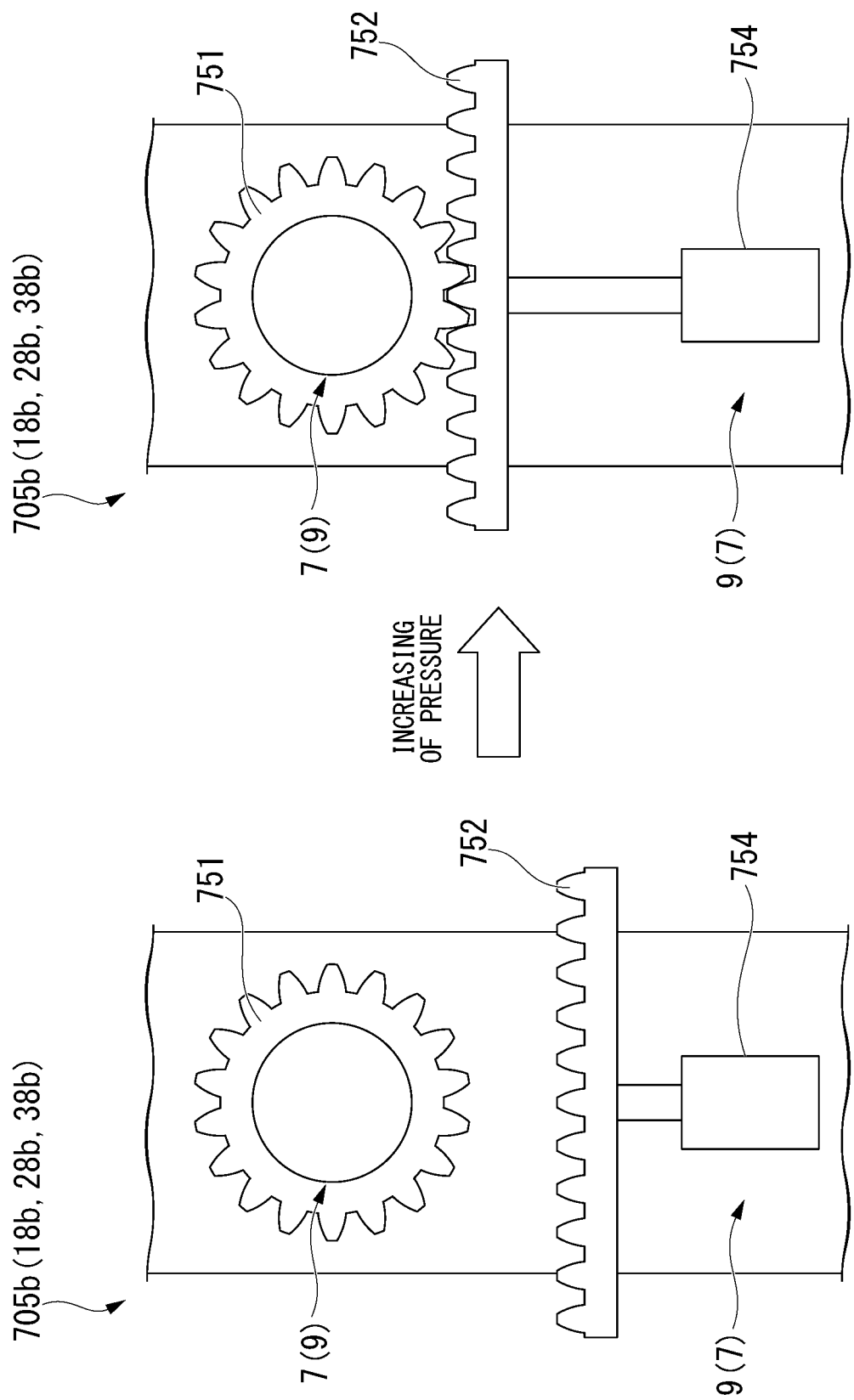
FIG. 20 is a schematic constitution diagram of a braking mechanism according to a seventh modified example.

FIG. 20 is a schematic constitution diagram of a braking mechanism in a seventh modified example.

A braking mechanism 705b in the seventh modified example includes a pinion 751 and a rack 752. The pinion 751 is disposed on one of a rotating member 7 and a support member 9. The rack 752 is disposed on the other of the rotating member 7 and the support member 9. The rotating member 7 is a member which rotates in each connecting section 18, 28, or 38. The support member 9 is a member which supports the rotating member 7 in each of the connecting sections 18, 28, and 38.

As illustrated in FIG. 3, the braking mechanism 705b includes a first braking mechanism 18b, a second braking mechanism 28b, and a third braking mechanism 38b.

The first braking mechanism 18b is disposed in the first connecting section 18. In the first braking mechanism 18b, the pinion 751 is disposed in a lower joint 4a connected to a suction pad 2 which is the rotating member 7. The rack 752 is disposed in a first end portion 12 of a first link 10 which is the support member 9.

The second braking mechanism 28b is disposed in a second connecting section 28. In the second braking mechanism 28b, the pinion 751 is disposed in a shaft 16 of the first link 10 which is the rotating member 7. The rack 752 is disposed at a first end portion 22 of a second link 20 which is the support member 9.

The third braking mechanism 38b is disposed in a third connecting section 38. In the third braking mechanism 38b, the pinion 751 is disposed in a shaft 36 of a base 30 which is the support member 9. The rack 752 is disposed at a second end portion 24 of the second link 20 which is the rotating member 7.

As illustrated in FIG. 20, the rack 752 is connected to a cylinder 754. The cylinder 754 communicates with an air pressure adjusting device different from the air pressure adjusting device 70. The cylinder 754 may communicate with the air pressure adjusting device 70 as in the tube member 4. The cylinder 754 causes the rack 752 to approach and be away from the pinion 751 using air pressure. The rack 752 can mesh with the pinion 751 when approaching the pinion 751. Thus, relative rotation between the rack 752 and the pinion 751 is regulated. Therefore, relative rotation between the rotating member 7 and the support member 9 having the rack 752 and the pinion 751 disposed therein is regulated.

As described in detail above, the braking mechanism 705b includes the pinion 751 and the rack 752. The pinion 751 is disposed in one of the rotating member 7 and the support member 9. The rack 752 is disposed in the other of the rotating member 7 and the support member 9. The rack 752 can mesh with the pinion 751.

Thus, the braking mechanism 705b is easily formed.

Figure 21:
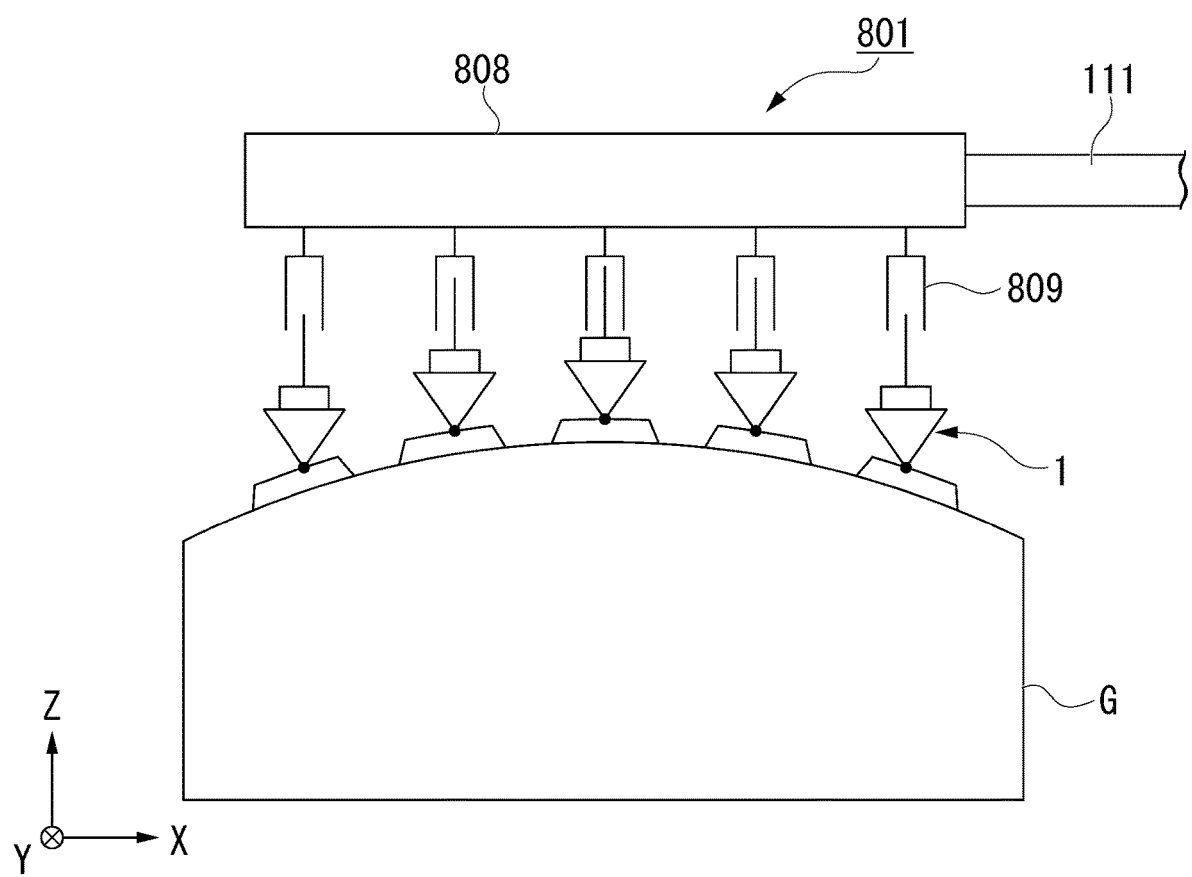
FIG. 21 is a schematic constitution diagram of a transporting device according to an eighth modified example.

FIG. 21 is a schematic constitution diagram of a transporting device 801 in an eighth modified example. The transporting device 801 in the eighth modified example includes a plurality of holding devices 1. The transporting device 801 includes the plurality of holding devices 1, a plurality of linear motion mechanisms 809, a base member 808, a robot arm (a robot) 111, an air pressure adjusting device 70 (refer to FIG. 11), and a transporting controller 115 (a controller; refer to FIG. 11).

The plurality of holding devices 1 are constituted by aligning and disposing the holding devices 1 in the embodiment in an XY plane.

The plurality of linear motion mechanisms 809 are disposed in the +Z direction of the plurality of holding devices 1. The +Z direction (a first direction) is a direction directed from suction pads 2 toward the base 30 of the holding devices 1. The plurality of linear motion mechanisms 809 support the plurality of holding devices 1 so that the plurality of holding devices 1 can move in the +Z direction and the −Z direction. The base member 808 is formed in a flat plate shape. The base member 808 is disposed in the +Z direction of the plurality of linear motion mechanisms 809 and supports the plurality of linear motion mechanisms 809. The linear motion mechanisms 809 may be an elastic linear motion mechanism obtained by combining an elastic member such as a spring, a cylindrical member, and the like. Furthermore, the linear motion mechanisms 809 may be mechanism which actively move linearly in combination with an electric actuator, a pneumatic actuator, or the like.

The robot arm 111 is connected to the base member 808.

The air pressure adjusting device 70 includes a plurality of switching valves 76. The plurality of switching valves 76 communicate with tube members 4 of the plurality of holding devices 1. The air pressure adjusting device 70 can individually adjust air pressure of suction pads 2 of the plurality of holding devices 1. Thus, the plurality of holding devices 1 are individually controlled so that suction motions of the plurality of holding devices 1 are performed and stop.

The transporting controller 115 controls the plurality of holding devices 1, the air pressure adjusting device 70, and the robot arm 111. Thus, the transporting controller 115 controls suctioning, transporting, and releasing of the goods G using the plurality of holding devices 1.

If the base member 808 is caused to approach the goods G, the plurality of linear motion mechanisms 809 expand and contract in the Z direction following the unevenness of a surface of each of the goods G. Thus, the plurality of holding devices 1 moves in the Z direction. Furthermore, suction surfaces F of the plurality of holding devices 1 moves along with the tilting of the surface of each of the goods G Thus, the transporting device 801 can hold the goods G having large unevenness in the surface thereof.

Carrying out and stopping suction motions of the plurality of holding devices 1 are individually controlled. Thus, the transporting device 801 can hold goods G in various sizes.

In the holding device 1 in the embodiment, the braking mechanism 5b operates using air pressure. On the other hand, the braking mechanism may be an electric mechanism.

In the holding device 1 in the embodiment, the suction sensor 2s is disposed in the suction pad 2. On the other hand, a pressure sensor as the suction sensor 2s may be disposed in the air pressure adjusting device 70.

In the holding device 1 in the embodiment, the tube member 4 is disposed in the Z direction. On the other hand, the tube member may be disposed along the plurality of links. Furthermore, cavities may be provided inside the plurality of links and the tube member may be disposed in the cavities.

According to at least one embodiment described above, the s axis and the t axis are not parallel to each other. Thus, the goods G in various states can be held.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A holding device, comprising:
   a suction pad;
   a first link which supports the suction pad so that the suction pad is able to rotate around a first rotation axis;
   a second link which supports the first link so that the first link is able to rotate around a second rotation axis;
   a base which supports the second link so that the second link is able to rotate around a third rotation axis; and
   a tube member which allows communication between the suction pad and the base and is able to be bent,
   wherein the second rotation axis and the third rotation axis are not parallel to each other.

2. The holding device according to claim 1, wherein the first rotation axis is a central axis of the suction pad and
   the first rotation axis is able to be disposed coaxially with the third rotation axis.

3. The holding device according to claim 2, wherein the second rotation axis intersects a suction surface of the suction pad when the first rotation axis and the third rotation axis are coaxial.

4. The holding device according to claim 3, wherein the second rotation axis intersects the first rotation axis and the third rotation axis on the suction surface of the suction pad when the first rotation axis and the third rotation axis are coaxial.

5. The holding device according to claim 1, wherein the tube member extends non-linearly between the suction pad and the base.

6. The holding device according to claim 1, further comprising a braking mechanism which stops rotation between the suction pad, the first link, or the second link which is a rotating member and a support member which supports the rotating member.

7. The holding device according to claim 6, wherein the braking mechanism communicates with the tube member and operates using air pressure.

8. The holding device according to claim 7, wherein the braking mechanism includes:
   a bag body which is able to expand and contract using air pressure; and
   a regulating member which is disposed inside the bag body and comes into close contact with the rotating member or the support member due to the contraction of the bag body.

9. The holding device according to claim 7, wherein the braking mechanism includes:
   a pinion which is disposed in one of the rotating member and the support member; and
   a rack which is disposed in another of the rotating member and the support member, the rack configured to mesh with the pinion.

10. A transporting device, comprising:
    the holding device according to claim 1;
    an air pressure adjusting device which is connected to the tube member and adjusts an air pressure of the suction pad;
    a robot which moves the holding device; and
    a controller which controls suctioning, transporting, and releasing of an object to be held using the holding device by controlling the holding device, the air pressure adjusting device, and the robot.

11. The transporting device according to claim 10, wherein the holding device includes a braking mechanism which stops rotation between the suction pad, the first link, or the second link which is a rotating member and a support member which supports the rotating member, and
    the controller performs control so that the object to be held is suctioned by a suction surface of the suction pad by bringing the suction surface thereof into contact with the object to be held in a state in which the braking mechanism is not being operated,
    the object to be held is held and moved up in a state in which the braking mechanism is not being operated, and
    the object to be held is transported in a state in which the braking mechanism has been operated.

12. The transporting device according to claim 11, wherein the controller operates the braking mechanism when a weight of the object to be held is equal to or greater than a predetermined weight.

13. The transporting device according to claim 12, wherein the holding device includes an angle sensor which outputs an angle signal corresponding to a rotation angle between the suction pad, the first link, or the second link which is a rotating member and a support member which supports the rotating member, and
    the controller detects a tilting angle of the suction surface of the suction pad on a basis of the angle signal, and performs a suction motion on the object to be held using the holding device again when a magnitude of a difference between a tilting angle of a surface of the object to be held suctioned by the suction pad and a tilting angle of the suction surface is equal to or greater than a predetermined angle.

14. A transporting device, comprising:
    a plurality of holding devices which are constituted by aligning and disposing the holding devices according to claim 1 in a plane intersecting a first direction from the suction pad toward the base;
    a plurality of linear motion mechanisms which are disposed in the first direction of the plurality of holding devices and support the plurality of holding devices so that the plurality of holding devices are able to move in the first direction and a direction opposite to the first direction;

a base member which is disposed in the first direction of the plurality of linear motion mechanisms and supports the plurality of linear motion mechanisms;

a robot which moves the base member;

an air pressure adjusting device which is connected to tube members of the plurality of holding devices and is able to individually adjust air pressures of suction pads of the plurality of holding devices; and a controller which controls the plurality of holding devices, the air pressure adjusting device, and the robot to control suctioning, transporting, and releasing of an object to be held using the plurality of holding devices.

* * * * *